(12) United States Patent
Uzun et al.

(10) Patent No.: US 9,472,813 B2
(45) Date of Patent: Oct. 18, 2016

(54) BATTERY ELECTROLYTE SOLUTION CONTAINING CERTAIN ESTER-BASED SOLVENTS, AND BATTERIES CONTAINING SUCH AN ELECTROLYTE SOLUTION

(75) Inventors: Oktay Uzun, Midland, MI (US); Dean M. Welsh, Midland, MI (US); David R. Wilson, Midland, MI (US); Ravi B. Shankar, Midland, MI (US); David J. Brennan, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 525 days.

(21) Appl. No.: 13/990,387

(22) PCT Filed: Dec. 13, 2011

(86) PCT No.: PCT/US2011/064681
§ 371 (c)(1),
(2), (4) Date: May 29, 2013

(87) PCT Pub. No.: WO2012/082760
PCT Pub. Date: Jun. 21, 2012

(65) Prior Publication Data
US 2013/0260229 A1    Oct. 3, 2013

Related U.S. Application Data

(60) Provisional application No. 61/423,147, filed on Dec. 15, 2010.

(51) Int. Cl.
*H01M 10/056* (2010.01)
*H01M 6/16* (2006.01)
*H01M 10/052* (2010.01)
(Continued)

(52) U.S. Cl.
CPC ........... *H01M 6/164* (2013.01); *H01M 10/052* (2013.01); *H01M 10/056* (2013.01); *H01M 10/0567* (2013.01); *H01M 10/0568* (2013.01); *H01M 10/0569* (2013.01);
(Continued)

(58) Field of Classification Search
CPC .................... H01M 10/0569; H01M 10/0567; H01M 10/052; H01M 10/0568; H01M 10/056; H01M 6/16; Y02E 60/122; Y02T 10/7011
See application file for complete search history.

(56) References Cited

U.S. PATENT DOCUMENTS 5,219,683 A    6/1993  Webber
6,492,064 B1  12/2002  Smart
(Continued)

FOREIGN PATENT DOCUMENTS

DE          10209477 A    9/2003
JP          09-147913 A   6/1997
(Continued)

OTHER PUBLICATIONS

Zhang et al., J. Power Sources, Elsevier SA, CH, vol. 162, No. 2, pp. 1379-1394 (2006).

*Primary Examiner* — Ula C Ruddock
*Assistant Examiner* — Lisa S Park
(74) *Attorney, Agent, or Firm* — Gary C Cohn PLLC

(57) ABSTRACT

Battery electrolyte solutions contain certain ester solvents, a lithium salt and vinylene carbonate, vinyl ethylene carbonate or fluoroethylene carbonate. Batteries containing these solvents have excellent specific discharge capacities and reduced weight compared to batteries in which the electrolyte is based on ethylene carbonate.

17 Claims, 12 Drawing Sheets

(51) Int. Cl.
  *H01M 10/0567* (2010.01)
  *H01M 10/0568* (2010.01)
  *H01M 10/0569* (2010.01)
(52) U.S. Cl.
  CPC .... *H01M 2300/0025* (2013.01); *Y02E 60/122* (2013.01); *Y02T 10/7011* (2013.01)

(56) References Cited

U.S. PATENT DOCUMENTS

2001/0019800 A1 9/2001 Herreyre
2004/0043299 A1 3/2004 Koike
2007/0148540 A1 6/2007 Chiga
2007/0287071 A1 12/2007 Chiga
2008/0241699 A1 10/2008 Halalay
2009/0253046 A1 10/2009 Smart et al.
2010/0035162 A1 2/2010 Chiga
2010/0081062 A1 4/2010 Chiga
2011/0123872 A1 5/2011 Koh
2011/0183161 A1 7/2011 Son

FOREIGN PATENT DOCUMENTS

WO 2010/002089 A 1/2010
WO 2010/004952 A 1/2010

US 9,472,813 B2

BATTERY ELECTROLYTE SOLUTION CONTAINING CERTAIN ESTER-BASED SOLVENTS, AND BATTERIES CONTAINING SUCH AN ELECTROLYTE SOLUTION

This application claims priority from U.S. Provisional Application No. 61/423,147, filed 15 Dec. 2010.

The present invention relates to nonaqueous electrolyte solutions and batteries that contain nonaqueous electrolyte solutions.

Lithium batteries are widely used as primary and secondary batteries for vehicles and many types of electronic equipment. These batteries often have high energy and power densities. The electrolyte solution in a lithium battery is by necessity a nonaqueous type. The nonaqueous electrolyte solution is generally a solution of a lithium salt in an organic solvent or a mixture of organic solvents that has a high dielectric constant.

The solvent must satisfy many demands, and for that reason very few solvent systems have found practical utility. There are some basic requirements which any candidate solvent must satisfy. These include the ability to maintain the lithium salt in solution over the entire range of operating temperatures; a high dielectric constant; chemical stability in the presence of the remaining components of the solution; and electrochemical stability over the operating voltages. In addition, the solvent must be a low vapor-pressure liquid over a wide temperature range; the useful range of operating temperatures for a battery is often constrained by the melting and boiling temperatures of the solvent system (or components thereof).

Although the foregoing criteria are necessary attributes of any practical solvent system, they do not completely define the solvent systems which will perform well in lithium battery electrolyte solutions. Many solvent systems that have all these attributes nonetheless do not perform adequately. As a result, essentially all practical lithium battery electrolyte solutions are based on a small handful of carbonate compounds such as ethylene carbonate, propylene carbonate, diethyl carbonate, dimethyl carbonate and ethylmethyl carbonate. Ethylene carbonate and mixtures of ethylene carbonate with diethyl carbonate and/or ethylmethyl carbonate are by far the most prevalent solvent systems.

A major reason behind the selection of the carbonate solvents is that they form stable solid electrolyte interface (SEI) layers at the graphite anode of the lithium battery. The main components of the SEI layer are decomposed solvent and salts. The SEI layer forms during the initial battery charging cycles. Therefore, in addition to all of the other necessary attributes, the organic solvent must be capable of forming an SEI layer that is both stable and functional. The SEI layer must be electronically insulative, but ionically conductive in the sense that the SEI layer permits lithium ions to migrate through it. SEI layer formation is critical to the performance of the battery. If no SEI layer forms, or if the SEI layer is not compact or stable, the battery will operate poorly if at all. There are large differences in SEI formation even among the carbonate solvents. Ethylene carbonate is a relatively good SEI former, but the other carbonates are less so. It is common to include an additive which further enhances SEI formation in these carbonate-based solutions. A range of compounds have been tried as SEI-promoting additives in carbonate-based solvent systems, with varying degrees of success.

An important limitation with the carbonate-based solvent systems is operating temperature. Ethylene carbonate by itself freezes at 37° C. and seldom can be used as a solvent by itself because it is a solid or viscous liquid within the normal range of operating temperatures for most uses. Therefore, it is usually necessary to add other materials to ethylene carbonate to reduce the freezing temperature and allow for a wider range of operating temperatures. Diethyl carbonate is usually present as a cosolvent for this reason. Even ethylene carbonate/diethyl carbonate solvent systems become very viscous or even freeze at temperatures of −20° C. or below, which results in poor ion transport through the electrolyte and a loss of battery performance. This poor low temperature performance is a major limitation in the use of these batteries in outdoor applications (such as vehicles) or other applications (such as space vehicles) in which the battery is exposed to cold.

In addition, ethylene carbonate can release carbon dioxide during cycling, which can lead to dimensional changes (swelling) in the battery. When ethylene carbonate decomposes during cycling, it releases a significant amount of heat, which decreases battery life and also represents a safety concern. In order to extend the useful temperature range, ethylene carbonate is usually combined with dialkyl carbonates, which have lower flash points than are desired.

Solvent systems that contain other materials have been suggested. Among those other materials are certain ester compounds. Certain ester compounds have been proposed as co-solvents in carbonate-based solvent systems to try to extend the operating temperature range to below −20° C. Several approaches along this line are described in US Published Patent Application No. 2009/0253046 and the references cited therein. There, certain specific ester compounds are incorporated into ethylene carbonate/ethylmethylcarbonate solvent systems in varying quantities. The ester compounds described in US 2009/0253046 are methyl propionate, ethyl propionate, methyl butyrate, ethyl butyrate, propyl butyrate and butyl butyrate. US 2009/0253046 describes earlier attempts to use other esters such as methyl formate, methyl acetate and ethyl acetate in multi-component electrolyte formulations, and states that those ester solvents do not result in good rate capability at lower temperatures and do not display good resilience at above 25° C., even when mixed with carbonate solvents.

U.S. Pat. No. 6,492,064 describes lithium battery electrolyte solvents that contain ethylene carbonate, dimethyl carbonate and methyl acetate, and other solvents that contain ethylene carbonate, dimethyl carbonate, diethyl carbonate, and an alkyl or fluoroalkyl ester compound.

US Published Patent Application No. 2008-0241699 proposes five specific esters as solvents for lithium ion battery electrolytes, based on the criteria of chemical stability in the presence of lithium salts, their large electrochemical stability window, melting temperature, viscosity, boiling temperature, flash point, vapor pressure, and cost. These esters are γ-valerolactone, methyl isobutyryl acetate, 2-methoxyethyl acetate, 2-ethoxyethyl acetate and diethyl oxalate. However, US 2008-0241699 does not describe any batteries made using such esters as the electrolyte solvent, and does not indicate whether, or under what conditions, any of these five specific esters can form stable SEI layers and therefore can, in fact, perform successfully as lithium battery electrolyte solvents. As shown below, at least three of these fail as electrolyte solvents, even when blended with another, known electrolyte solvent and an SEI former. US 2008-0241699 proposes to blend ethylene carbonate with the ester compounds as an SEI former.

What is desired is a solvent system for a lithium battery electrolyte solution, which solvent system performs over a temperature range from at least −30° C. to at least 40° C., and which forms a stable SEI layer and so permits good battery performance.

This invention is in one aspect a nonaqueous battery electrolyte solution comprising:

(1) at least one lithium salt in an amount to provide at least a 0.1 M solution of the lithium salt in the battery electrolyte solution, (2) at least one ether ester compound having up to twelve carbon atoms, at least one monoalkyl ester compound having up to eight carbon atoms, or a mixture thereof, in which the lithium salt is soluble to the extent of at least 0.1 mole per liter, wherein the ether ester compound or monoalkyl ester compound may be partially or completely fluorinated and (3) from 0.5 to 20% by weight, based on the combined weight of components (2) and (3), of vinylene carbonate, 4-vinyl-1,3-dioxolan-2-one, fluoroethylenecarbonate or a mixture of any two or more thereof.

The invention is also a battery comprising an anode, a cathode, a separator disposed between the anode and cathode, and the foregoing electrolyte solution of the invention in contact with the anode and cathode.

Applicants have discovered that combinations of vinylene carbonate, 4-vinyl-1,3-dioxolan-2-one and/or fluoroethylcarbonate with these ester solvents provide for excellent battery performance. This is the case even when the battery electrolyte solution contains only small amounts of non-halogenated cyclic alkyl carbonates and non-halogenated linear dialkyl carbonate solvents, if any at all. The presence of small amounts of vinylene carbonate, 4-vinyl-1,3-dioxolan-2-one and/or fluoroethylcarbonate in the battery electrolyte solution of the invention appears to result in the formation of a stable and functional SEI layer. This result is surprising, because SEI formation in prior lithium batteries has largely depended on the presence of non-halogenated cyclic alkyl carbonate compounds such as ethylene carbonate or propylene carbonate. In addition, applicants have found that other SEI promoters which have been known to be useful in ethylene carbonate- or propylene carbonate-based solvent systems fail to perform adequately with these ester solvents, unless a large amount of ethylene carbonate or propylene carbonate is present.

Therefore, this invention provides a means through which ethylene carbonate, propylene carbonate, and dialkyl carbonates can be mostly or completely replaced with certain ester solvents. Accordingly, in preferred embodiments, the battery electrolyte solution contains no more than 30%, preferably no more than 20% and still more preferably no more than 10%, based on the weight of the solution, of non-halogenated alkylene carbonates such as ethylene carbonate or propylene carbonate and/or of a non-halogenated linear dialkyl carbonate or a mixture thereof, and may contain none of those materials.

The invention permits one to gain the benefits that these ester solvents potentially offer, in particular good low temperature performance, in a simple formulation. The battery electrolyte solution also offers other advantages, such as lower bulk density than electrolyte solutions based on ethylene carbonate, minimal gas generation, and higher flash point than many ethylene carbonate-based electrolytes. Many of the ester compounds release less heat upon decomposition than does ethylene carbonate, which further contributes to battery life and safety. The battery electrolyte solution is also stable at higher voltages, permitting the construction of batteries having voltages up to 5 V or higher.

This invention is in other aspects a nonaqueous battery electrolyte solution comprising:

(1) at least one lithium salt in an amount to provide at least a 0.1 M solution of the lithium salt in the battery electrolyte solution, and (2) a 2-alkoxy-1-alkylethyl acetate or 2-alkoxy-2-alkylethyl acetate having up to 12 carbon atoms, wherein the alkoxy group contains from 1 to 7, preferably from 1 to 3 and more preferably 1 or 2 carbon atoms and may be partially or completely fluorinated and wherein the alkyl group contains from 1 to 7, preferably from 1 to 3 and more preferably 1 or 2 carbon atoms, and may be partially or completely fluorinated, in an amount sufficient to dissolve the lithium salt. The invention is also a battery comprising an anode, a cathode, a separator disposed between the anode and cathode, with this battery electrolyte solution in contact with the anode and cathode.

2-Alkoxy-1-alkylethyl acetate and 2-alkoxy-2-alkylethyl acetate compounds are especially beneficial solvents for a nonaqueous electrolyte solution. These materials provide for good battery performance over a wide range of temperatures, even in the absence or near-absence of non-halogenated alkylene carbonate compounds such as ethylene carbonate and propylene carbonate and non-halogenated dialkyl carbonate compounds. 2-Alkoxy-1-alkylethyl acetate and 2-alkoxy-2-alkylethyl acetate compounds have high flash points, low freezing points, and release less heat than ethylene carbonate when they do decompose during battery cycling. 2-Alkoxy-1-alkylethyl acetate and 2-alkoxy-2-alkylethyl acetate compounds also have bulk densities that are much lower than ethylene carbonate, and so their use can lead to a significant reduction in battery weight. Yet another advantage of the 2-alkoxy-1-alkylethyl acetate and 2-alkoxy-2-alkylethyl acetate solvents is that the battery electrolyte solution and batteries containing the electrolyte solution are more stable in the presence of small amounts of water (such as up to 1000 ppm of water or more based on the weight of the battery electrolyte solution). Unlike ethylene carbonate-based battery electrolyte solutions, which exhibit a loss of capacity retention when the solution contains as little as 50 ppm water, batteries containing the battery electrolyte solutions of the invention exhibit excellent retention of capacity even at water contents of as much as 1000 ppm of water or more.

This invention is in other aspects a nonaqueous battery electrolyte solution comprising:

(1) at least one lithium salt in an amount to provide at least a 0.1 M solution of the lithium salt in the battery electrolyte solution, and (2) an ether ester compound represented by either of structures I and II, wherein structure I

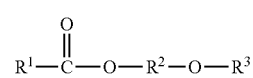

(I)

wherein $R^1$ is hydrogen, a linear or branched alkyl group having from 1 to 5 carbon atoms, or a $R^4$—O—$R^5$— group where $R^4$ is alkyl, $R^5$ is alkylene and $R^4$ and $R^5$ together have up to 5 carbon atoms, $R^2$ is a linear or branched alkylene group having from 1 to 7 carbon atoms, and $R^3$ is a branched or linear alkyl group having from 1 to 3 carbon atoms, wherein $R^1$, $R^2$ and $R^3$ together have up to 12 carbon atoms and at least one of $R^1$, $R^2$ and $R^3$ is at least partially fluorinated, and structure II is

wherein $R^6$ is hydrogen, a linear or branched alkyl group having from 1 to 6 carbon atoms or a $R^8$—O—$R^9$— group where $R^8$ is alkyl, $R^9$ is alkylene and $R^8$ and $R^9$ together have up to 6 carbon atoms, and $R^7$ is a linear or branched alkyl group having up to 6 carbon atoms wherein at least one of $R^6$ and $R^7$ is at least partially fluorinated and further wherein $R^6$ and $R^7$ together have up to 7 carbon atoms. The invention is also a battery comprising an anode, a cathode, a separator disposed between the anode and cathode, with this battery electrolyte solution in contact with the anode and cathode.

Figure 1:
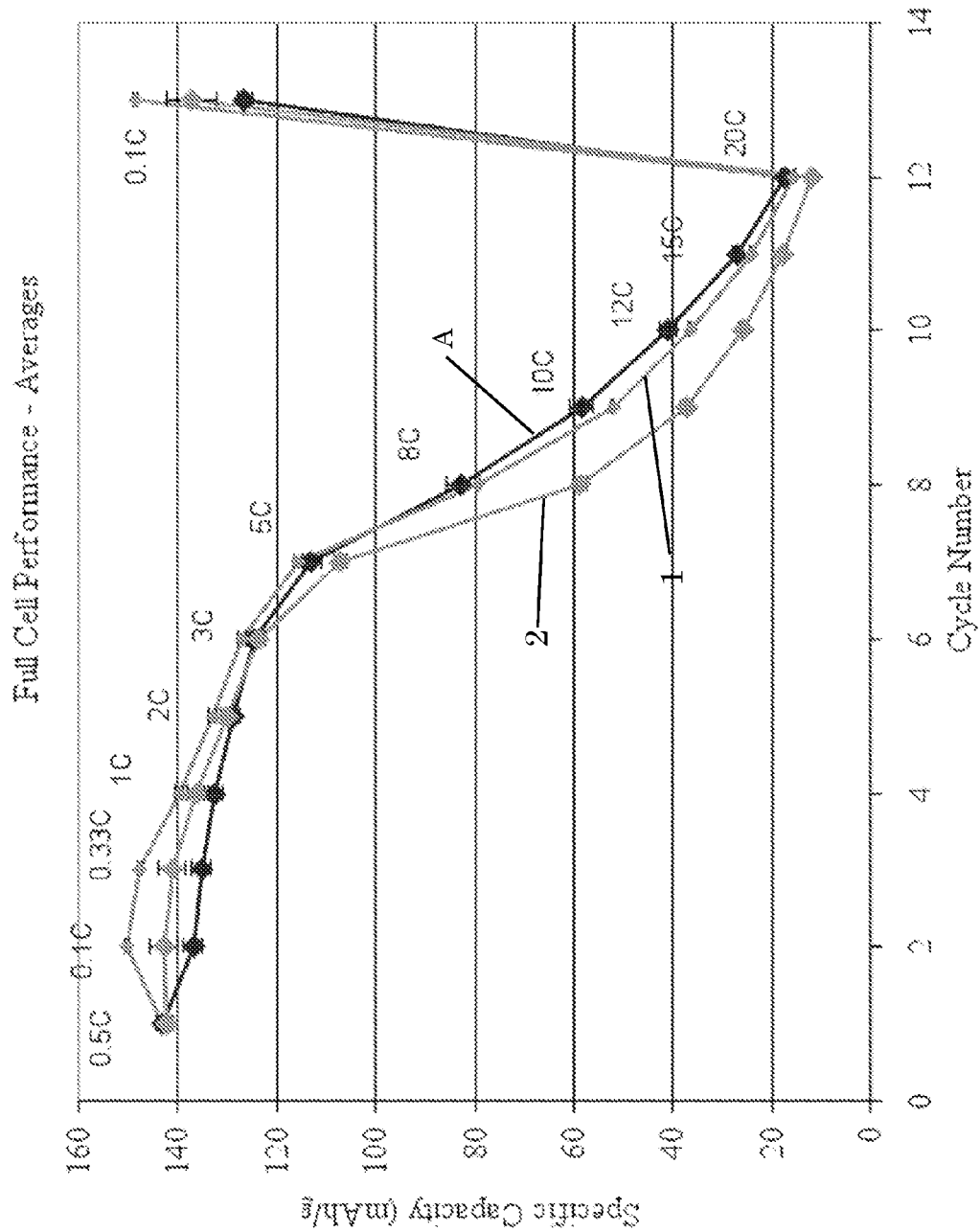
FIG. 1 is a graph of full cycle discharge curves for two batteries in accordance with the invention (Ex. 1 and 2) and a comparative battery (Comparative Battery A).

The lithium salt may be any that is suitable for battery use, including lithium salts such as $LiAsF_6$, $LiPF_6$, $LiPF_4(C_2O_4)$, $LiPF_2(C_2O_4)_2$, $LiBF_4$, $LiB(C_2O_4)_2$, $LiBF_2(C_2O_4)$, $LiClO_4$, $LiBrO_4$, $LiIO_4$, $LiB(C_6H_5)_4$, $LiCH_3SO_3$, $LiN(SO_2C_2F_5)_2$, and $LiCF_3SO_3$. $LiPF_6$, $LiPF_4(C_2O_4)$, $LiBF_4$, $LiB(C_2O_4)_2$, $LiCF_3SO_3$, and $LiN(SO_2CF_3)_2$ are preferred types, and $LiPF_6$ is an especially preferred lithium salt. Mixtures of any two or more of the foregoing lithium salts may also be employed.

The battery electrolyte solution has a lithium salt concentration of at least 0.1 moles/liter (0.1 M), preferably at least 0.5 moles/liter (0.5 M), more preferably at least 0.75 moles/liter (0.75 M), preferably up to 3 moles/liter (3.0 M), and more preferably up to 1.5 moles/liter (1.5 M).

The battery electrolyte solution contains at least one ether ester compound having up to 12 carbon atoms, and/or at least one monoalkyl ester compound having up to eight carbon atoms, in which ester compound the lithium salt is soluble to the extent of a least 0.1 mole per liter of ester compound. The ether ester compound or monoalkyl ester compound may be partially or completely fluorinated, by which it is meant that some or all (in the case of complete fluorination) of the hydrogens bonded to carbon atoms may be replaced with fluorine.

The ether ester compounds can be represented by structure I

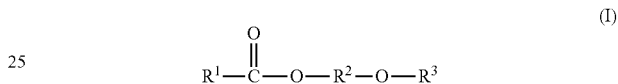

wherein $R^1$ is hydrogen, a linear or branched alkyl group having from 1 to 5 carbon atoms, or a $R^4$—O—$R^5$— group where $R^4$ is alkyl, $R^5$ is alkylene and $R^4$ and $R^5$ together have up to 5 carbon atoms. $R^2$ is a linear or branched alkylene group having from 1 to 7 carbon atoms, and $R^3$ is a branched or linear alkyl group having from 1 to 3 carbon atoms. $R^1$, $R^2$ and $R^3$ together have up to 12 carbon atoms, preferably up to 9 carbon atoms and more preferably up to 7 carbon atoms. Any or all of $R^1$, $R^2$ and $R^3$ may be partially or completely fluorinated.

$R^1$ preferably is a straight-chain alkyl group having from 1 to 3 carbon atoms which may be partially or completely fluorinated. $R^1$ is most preferably methyl, ethyl, fluoromethyl, difluoromethyl, or trifluoromethyl.

$R^2$ preferably is a linear alkylene group having from 2 to 3 carbon atoms which may be partially or completely fluorinated. $R^2$ is most preferably ethylene (—$CH_2$—$CH_2$—), 2-methylethylene (—$CH_2$—$CH(CH_3)$—), 1-methylethylene (—$CH(CH_3)$—$CH_2$—), propylene (—$CH_2$—$CH_2$—$CH_2$—), or 2,2-difluoropropylene (—$CH_2$—$CF_2$—$CH_2$—).

$R^3$ preferably is a straight-chain alkyl group having from 1 to 3 carbon atoms which may be partially or completely fluorinated straight-chain or branched alkyl group having from 1 to 3 carbon atoms. $R^3$ more preferably contains 1 or 2 carbon atoms. $R^3$ is most preferably methyl, ethyl, 2-fluoroethyl, 2,2-difluoroethyl, or 2,2,2-trifluoroethyl.

Preferred ether ester compounds include 2-alkoxyethyl acetates, 2-alkoxy-1-alkylethyl acetates and 2-alkoxy-2-alkylethyl acetates having up to 12 carbon atoms, such as 2-methoxyethyl acetate, 2-ethoxyethyl acetate, 2-methoxy-1-methylethyl acetate, 2-methoxy-2-methylethyl acetate, 2-ethoxy-1-methylethyl acetate, 2-ethoxy-2-methylethyl acetate, 2-(2,2,2-trifluoroethoxy)-ethyl acetate 2-(2,2,2-trifluoroethoxy)-1-methylethyl acetate, 2-(2,2,2-trifluoroethoxy)-2-methylethyl acetate, 2-methoxyethyl fluoroacetate, 2-ethoxyethyl fluoroacetate, 2-methoxy-1-methylethyl fluoroacetate, 2-methoxy-2-methylethyl fluoroacetate, 2-ethoxy-1-methylethyl fluoroacetate, 2-ethoxy-2-methylethyl fluoroacetate, 2-(2,2,2-trifluoroethoxy)-ethyl fluoroacetate, 2-methoxyethyl difluoroacetate, 2-ethoxyethyl difluoroacetate, 2-methoxy-1-methylethyl difluoroacetate, 2-methoxy-2-methylethyl difluoroacetate, 2-ethoxy-1-methylethyl difluoroacetate, 2-ethoxy-2-methylethyl difluoroacetate, 2-(2,2,2-trifluoroethoxy)-ethyl difluoroacetate, 2-methoxyethyl trifluoroacetate, 2-ethoxyethyl trifluoroacetate, 2-methoxy-1-methylethyl trifluoroacetate, 2-methoxy-2-methylethyl trifluoroacetate, 2-ethoxy-1-methylethyl trifluoroacetate, 2-ethoxy-2-methylethyl trifluoroacetate, or 2-(2,2,2-trifluoroethoxy)-ethyl trifluoroacetate or mixtures of two or more thereof.

Other useful ether ester compounds include 2-methoxyethyl propionate, 2-ethoxyethyl propionate, 2-methoxy-1-methylethyl propionate, 2-ethoxy-1-methylethyl propionate, 2-methoxy-2-methylethyl propionate, 2-ethoxy-2-methylethyl propionate, 2-(2,2,2-trifluoroethoxy)-ethyl propionate, 2-(2,2,2-trifluoroethoxy)-1-methylethyl propionate, 2-(2,2,2-trifluoroethoxy)-2-methylethyl propionate, 2-methoxyethyl 2-fluoropropionate, 2-ethoxyethyl 2-fluoropropionate, 2-methoxy-1-methylethyl 2-fluoropropionate, 2-ethoxy-1-methylethyl 2-fluoropropionate, 2-methoxy-2-methylethyl 2-fluoropropionate, 2-ethoxy-2-methylethyl 2-fluoropropionate, 2-methoxyethyl 2,2-difluoropropionate, 2-ethoxyethyl 2,2-difluoropropionate, 2-methoxy-1-methylethyl 2,2-difluoropropionate, 2-ethoxy-1-methylethyl 2,2-difluoropropionate, 2-methoxyethyl 3-fluoropropionate, 2-ethoxyethyl 3-fluoropropionate, 2-methoxy-1-methylethyl 3-fluoropropionate, 2-ethoxy-1-methylethyl 3-fluoropropionate, 2-methoxy-2-methylethyl 3-fluoropropionate, 2-ethoxy-2-methylethyl 3-fluoropropionate, 2-methoxyethyl 3,3-difluoropropionate, 2-ethoxyethyl 3,3-difluoropropionate, 2-methoxy-1-methylethyl 3,3-difluoropropionate, 2-ethoxy-1-methylethyl 3,3-difluoropropionate, 2-methoxy-2-methylethyl 3,3-difluoropropionate, 2-ethoxy-2-methylethyl 3,3-difluoropropionate, 2-methoxyethyl 3,3,3-trifluoropropionate, 2-ethoxyethyl 3,3,3-trifluoropropionate, 2-methoxy-1-methylethyl 3,3,3-trifluoropropionate, 2-ethoxy-1-methylethyl 3,3,3-trifluoropropionate, 2-methoxy-2-methylethyl 3,3,3-trifluoropropionate, 2-ethoxy-2-methylethyl 3,3,3-trifluoropropionate, 2-methoxyethyl 2,3,3,3-tetrafluoropropionate, 2-ethoxyethyl 2,3,3,3-tetrafluoropropionate, 2-methoxy-1-methylethyl 2,3,3,3-tetrafluoropropionate, 2-ethoxy-1-methylethyl 2,3,3,3-tetrafluoropropionate, 2-methoxy-2-methylethyl 2,3,3,3-tetrafluoropropionate, 2-ethoxy-2-methylethyl 2,3,3,3-tetrafluoropropionate, 2-methoxyethyl 2-methoxyacetate, 2-ethoxyethyl 2-methoxyacetate, 2-methoxyethyl 2-ethoxyacetate, 2-ethoxyethyl 2-ethoxyacetate, 2-methoxyethyl 2-methoxypropionate, 2-ethoxyethyl 2-methoxypropionate, 2-methoxyethyl 2-ethoxypropionate, 2-ethoxyethyl 2-ethoxypropionate, 2-methoxy-2-methylethyl 2,2-difluoropropionate, 2-ethoxy-2-methylethyl 2,2-difluoropropionate, 2-methoxy-1-methylethyl 2-methoxyacetate, 2-ethoxy-1-methylethyl 2-methoxyacetate, 2-methoxy-2-methylethyl 2-methoxyacetate, 2-ethoxy-2-methylethyl 2-methoxyacetate, 2-methoxy-1-methylethyl 2-ethoxyacetate, 2-ethoxy-1-methylethyl 2-ethoxyacetate, 2-methoxy-2-methylethyl 2-ethoxyacetate, 2-ethoxy-2-methylethyl 2-ethoxyacetate, 2-methoxy-1-methylethyl 2-methoxypropionate, 2-ethoxy-1-methylethyl 2-methoxypropionate, 2-methoxy-2-methylethyl 2-methoxypropionate, 2-ethoxy-2-methylethyl 2-methoxypropionate, 2-methoxy-1-methylethyl 2-ethoxypropionate, 2-ethoxy-1-methylethyl 2-ethoxypropionate, 2-methoxy-2-methylethyl 2-ethoxypropionate, 2-ethoxy-2-methylethyl 2-ethoxypropionate, 2-(2,2,2-trifluoroethoxy)ethyl 2-methoxyacetate, 2-methoxyethyl 2-(2,2,2-trifluoroethoxy)acetate, 2-(2,2,2-trifluoroethoxy)ethyl 2-ethoxyacetate, 2-ethoxyethyl 2-(2,2,2-trifluoroethoxy)acetate, 2-(2,2,2-trifluoroethoxy)ethyl 2-methoxypropionate, 2-methoxyethyl 2-(2,2,2-trifluoroethoxy)propionate, 2-(2,2,2-trifluoroethoxy)ethyl 2-ethoxypropionate, 2-ethoxyethyl 2-(2,2,2-trifluoroethoxy)propionate, 2-(2,2,2-trifluoroethoxy)-1-methylethyl 2-methoxyacetate, 2-(2,2,2-trifluoroethoxy)-2-methylethyl 2-methoxyacetate, 2-methoxy-1-methylethyl 2-(2,2,2-trifluoroethoxy)acetate, 2-(2,2,2-trifluoroethoxy)-1-methylethyl 2-ethoxyacetate, 2-ethoxy-1-methylethyl 2-(2,2,2-trifluoroethoxy)acetate, 2-(2,2,2-trifluoroethoxy)-1-methylethyl 2-(2,2,2-trifluoroethoxy)acetate, 2-methoxy-2-methylethyl 2-(2,2,2-trifluoroethoxy)acetate, 2-(2,2,2-trifluoroethoxy)-2-methylethyl 2-ethoxyacetate, 2-ethoxy-2-methylethyl 2-(2,2,2-trifluoroethoxy)acetate, 2-(2,2,2-trifluoroethoxy)-2-methylethyl 2-(2,2,2-trifluoroethoxy)acetate, 2-(2,2,2-trifluoroethoxy)-1-methylethyl 2-methoxypropionate, 2-(2,2,2-trifluoroethoxy)-2-methylethyl 2-methoxypropionate, 2-methoxy-1-methylethyl 2-(2,2,2-trifluoroethoxy)propionate, 2-(2,2,2-trifluoroethoxy)-1-methylethyl 2-ethoxypropionate, 2-ethoxy-1-methylethyl 2-(2,2,2-trifluoroethoxy)propionate, 2-(2,2,2-trifluoroethoxy)-1-methylethyl 2-(2,2,2-trifluoroethoxy)propionate, 2-methoxy-2-methylethyl 2-(2,2,2-trifluoroethoxy)propionate, 2-(2,2,2-trifluoroethoxy)-2-methylethyl 2-ethoxypropionate, 2-ethoxy-2-methylethyl 2-(2,2,2-trifluoroethoxy)propionate, 2-(2,2,2-trifluoroethoxy)-2-methylethyl 2-(2,2,2-trifluoroethoxy)propionate, and the like.

The monoalkyl ester compounds can be represented by structure II

(II)

wherein $R^6$ is hydrogen, a linear or branched alkyl group having from 1 to 6 carbon atoms, which may be partially or completely fluorinated or a $R^8$—O—$R^9$— group where $R^8$ is alkyl, $R^9$ is alkylene and $R^8$ and $R^9$ together have up to 6 carbon atoms, and $R^7$ is a linear or branched alkyl group having up to 6 carbon atoms which may be partially or completely fluorinated. $R^6$ and $R^7$ together have up to 7 carbon atoms and preferably together contain from 3 to 6 carbon atoms. $R^6$ preferably contains at least one carbon atom.

Examples of suitable monoalkyl ester compounds include methyl formate, ethyl formate, propyl formate, isopropyl formate, butyl formate, methyl acetate, ethyl acetate, propyl acetate, isopropyl acetate, isobutyl acetate, butyl acetate, amyl acetate, hexyl acetate, methyl propionate, ethyl propionate, propyl propionate, isopropyl propionate, isobutyl propionate, butyl propionate, pentyl propionate, methyl butyrate, ethyl butyrate, propyl butyrate, isopropyl butyrate, methyl valerate, ethyl valerate, ethyl isovalerate, ethyl hexanoate, methyl hexanoate, 2,2,2-trifluoroethyl formate, 2,2,2-trifluoroethyl acetate, 2,2,2-trifluoroethyl propionate, 2,2,2-trifluoroethyl butyrate, 2,2,2-trifluoroethyl valerate, 2,2,2-trifluoroethyl isovalerate, 2,2,2-trifluoroethyl hexanoate, methyl fluoroacetate, ethyl fluoroacetate, propyl fluoroacetate, butyl fluoroacetate, amyl fluoroacetate, hexyl fluoroacetate, methyl 2,2-difluoropropionate, ethyl 2,2-difluoropropionate, propyl 2,2-difluoropropionate, butyl 2,2-difluoropropionate, pentyl 2,2-difluoropropionate, methyl 3,3,3-trifluoropropionate, ethyl 3,3,3-trifluoropropionate, propyl 3,3,3-trifluoropropionate, butyl 3,3,3-trifluororopropionate, pentyl 3,3,3-trifluoropropionate, methyl 2,2-difluorobutyrate, ethyl 2,2-difluorobutyrate, propyl 2,2-difluorobutyrate, methyl valerate, ethyl valerate, ethyl isovalerate, ethyl hexanoate, methyl hexanoate, methyl 2-methoxyacetate, ethyl 2-methoxyacetate, propyl 2-methoxyacetate, isopropyl 2-methoxyacetate, butyl 2-methoxyacetate, methyl 2-ethoxyacetate, ethyl 2-ethoxyacetate, propyl 2-ethoxyacetate, isopropyl 2-ethoxyacetate, butyl 2-ethoxyacetate, methyl 2-methoxypropionate, ethyl 2-methoxypropionate, propyl 2-methoxypropionate, isopropyl 2-methoxypropionate, butyl 2-methoxypropionate, methyl 2-ethoxypropionate, ethyl 2-ethoxypropionate, propyl 2-ethoxypropionate, isopropyl 2-ethoxypropionate, butyl 2-ethoxypropionate, (2,2,2-trifluoroethyl) 2-methoxyacetate, 2,2-difluoropropyl 2-methoxyacetate, (2,2,2-trifluoro)-1-methylethyl 2-methoxyacetate, (2,2,2-trifluoro)-1-(trifluoromethyl)ethyl 2-methoxyacetate, 2-fluorobutyl 2-methoxyacetate, 2,2-difluorobutyl 2-methoxyacetate, methyl 2-(2,2,2-trifluoroethoxy)acetate, methyl 2-(2,2,2-trifluoroethoxy)acetate, (2,2,2-trifluoroethoxy)-2-ethoxyacetate, ethyl 2-(2,2,2-trifluoroethoxy)acetate, (2,2,2-trifluoroethoxy) 2-(2,2,2-trifluoroethoxy)acetate, propyl 2-(2,2,2-trifluoroethoxy)acetate, isopropyl 2-(2,2,2-trifluoroethoxy)acetate, (2,2,2-trifluoro)-1-methylethyl 2-ethoxyacetate, (2,2,2-trifluoro)-1-(trifluoromethyl)ethyl 2-ethoxyacetate, butyl 2-(2,2,2-trifluoroethoxy)acetate, 2-fluorobutyl 2-ethoxyacetate, 2,2-difluorobutyl 2-ethoxyacetate, (2,2,2-trifluoroethyl) 2-methoxypropionate, 2,2-difluoropropyl 2-methoxypropionate, (2,2,2-trifluoro)-1-methylethyl 2-methoxypropionate, (2,2,2-trifluoro)-1-(trifluoromethyl) ethyl 2-methoxypropionate, 2-fluorobutyl 2-methoxypropionate, 2,2-difluorobutyl 2-methoxypropionate, methyl 2-(2,2,2-trifluoroethoxy)propionate, methyl 2-(2,2,2-trifluoroethoxy)propionate, (2,2,2-trifluoroethoxy)-2-ethoxypropionate, ethyl 2-(2,2,2-trifluoroethoxy) propionate, (2,2,2-trifluoroethoxy) 2-(2,2,2-trifluoroethoxy) propionate, propyl 2-(2,2,2-trifluoroethoxy)propionate, isopropyl 2-(2,2,2-trifluoroethoxy)propionate, (2,2,2-trifluoro)-1-methylethyl 2-ethoxypropionate, (2,2,2-trifluoro)-1-(trifluoromethyl)ethyl 2-ethoxypropionate, butyl 2-(2,2,2-trifluoroethoxy)propionate, 2-fluorobutyl 2-ethoxypropionate, 2,2-difluorobutyl 2-ethoxypropionate, and the like. Mixtures of two or more ether esters compounds and/or monoalkyl ester compounds can be used.

It is generally preferred that the ether ester compound or monoalkyl ester compound contains less than 2000, preferably less than 1000 ppm, more preferably less than 200 ppm, still more preferably less than 50 ppm, and even more preferably no more than 30 ppm each of water and alcohol compounds, although as mentioned before, an advantage of the battery electrolyte solution of the invention is that it can tolerate the presence of these levels of water without undue loss of capacity retention.

The foregoing ether ester and monoalkyl ester compounds are good electrolyte solvents when combined with vinylene carbonate, 4-vinyl-1,3-dioxolan-2-one and/or fluoroethylenecarbonate, and it is not necessary to include additional electrolyte solvents in the battery electrolyte solution. In particular, it is not necessary to include carbonate compounds (other than fluoroethylenecarbonate, when that compound is present) in the battery electrolyte solution, although they may be present if desired. Surprisingly, it has been found that the presence of carbonate compounds, especially non-halogenated alkylene carbonates and non-halogenated dialkyl carbonates, is not needed in the battery electrolyte solutions of the invention and, in particular, batteries containing the electrolyte solution form stable SEI layers and perform well even in the absence of these carbonate compounds. Therefore, the battery electrolyte solution in some embodiments contains no more than 20%, no more than 10%, no more than 5%, no more than 2%, no more than 1% or no more than 0.5% of a non-halogenated alkylene carbonate such ethylene carbonate, propylene carbonate, and/or a non-halogenated dialkyl carbonate, and can even be devoid of these compounds.

In addition, other solvents may be present, provided that they are soluble in the ether ester compound or monoalkyl ester at the proportions that are present. Examples of these other solvents include, for example, alkyl ethers including dimethoxyethane, diethoxyethane, diethyl ether, tetrahydrofuran and the like; cyclic esters such as gamma-butyrolactone, gamma-valerolactone, delta-valerolactone and the like; mononitriles such as acetonitrile and propionitrile; dinitriles such as glutaronitrile; symmetric sulfones such as dimethyl sulfone, diethyl sulfone and the like; asymmetric sulfones such as ethyl methyl sulfone, propyl methyl sulfone and the like; derivatives of such symmetric or asymmetric sulfones such as methyl methoxyethyl sulfone, ethyl methoxyethyl sulfone and the like; sulfolanes such as tetramethylene sulfolane; and the like. It is preferred that any such additional solvents in the aggregate constitute no more than 30%, preferably no more than 20%, more preferably no more than 10%, still more preferably no more than 5%, even more preferably no more than 1% and most preferably no more than 0.5% of the total weight of the electrolyte solution. The electrolyte solution may be devoid of such additional solvents.

The battery electrolyte solution in some aspects of the invention contains vinylene carbonate, 4-vinyl-1,3-dioxolan-2-one, fluoroethylene carbonate or a mixture of two or more of these. The vinylene carbonate, 4-vinyl-1,3-dioxolan-2-one and/or fluoroethylene carbonate should constitute from 0.5 to 20% by weight of the combined weight thereof plus the ether ester compound and/or monoalkyl ester. Greater amounts can be used in principle, but there is little advantage in doing so. Amounts less than about 0.5% by weight tend to be ineffective in producing good battery performance. A preferred level is at least 1% by weight. A preferred upper limit is 5% by weight, and a more preferred upper limit is 2.5% by weight, as these quantities are generally sufficient to obtain good battery performance, especially in smaller batteries in which the ratio of electrolyte volume (in microliters) to battery capacity (in milliamp-hours) is greater than 10. In larger batteries in which the ratio of electrolyte volume (in microliters) to battery capacity (in milliamp-hours) is less than 10, a preferred lower limit is at least 2 weight percent, more preferably at least 5 weight percent and a preferred upper limit is 20 weight percent, more preferably 15 weight percent and still more preferably 12 weight percent.

Various other additives may be present in the battery electrolyte solution in addition to the components already mentioned. These may include, for example, various cathode protection agents, lithium salt stabilizers, lithium deposition improving agents, ionic solvation enhancers, corrosion inhibitors, wetting agents, flame retardants (or thermal runaway inhibitors), and viscosity reducing agents. Many additives of these types are described by Zhang in "A review on electrolyte additives for lithium-ion batteries", *J. Power Sources* 162 (2006) 1379-1394.

Suitable cathode protection agents include materials such as N,N-diethylamino-trimethylsilane and $LiB(C_2O_4)_2$. Lithium salt stabilizers include LiF, tris(2,2,2-trifluoroethyl) phosphite, 1-methyl-2-pyrrolidinone, fluorinated carbamate and hexamethyl-phosphoramide. Examples of lithium deposition improving agents include sulfur dioxide, polysulfides, carbon dioxide, surfactants such as tetraalkylammonium chlorides, lithium and tetraethylammonium salts of perfluorooctanesulfonate, various perfluoropolyethers and the like. Crown ethers can be suitable ionic solvation enhancers, as are various borate, boron and borole compounds. LiB$(C_2O_4)_2$ and $LiF_2C_2O_4$ are examples of aluminum corrosion inhibitors. Cyclohexane, trialkyl phosphates, and certain carboxylic acid esters are useful as wetting agents and viscosity reducers. Examples of flame retardants or "thermal runaway inhibitors" include various phosphine oxide $(O:PR_3)$, phosphinite $(P(OR)R_2)$, phosphonite $(P(OR_2)R)$, phosphite $(P(OR)_3)$, phosphinate $(O:P(OR)R_2)$, phosphonate $(O:P(OR)_2R)$, and phosphate $(O:P(OR)_3)$, such as tris(2,2,2-trifluoroethyl)phosphate, compounds wherein each R is independently hydrogen or a hydrocarbyl group having up to 12 carbon atoms, as well as phosphazene $(-N=PR_2-)_x$ compounds, wherein each R is independently halogen, a hydrocarbyl group having up to 12 carbon atoms, a hydrocarbylamino group having up to 12 carbon atoms, or a hydrocarbyloxy group having up to 12 carbon atoms and x is 3, 4 or 5, as well as aromatic phosphorus compounds represented by structure I:

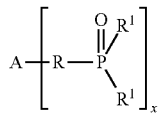

wherein A is a radical that contains one or more aromatic rings; each R is independently an alkylene diradical which may contain 1, 2 or 3 carbon atoms and which is bonded directly to a carbon atom of an aromatic ring of the A group; each $R^1$ is independently hydrogen, halogen, OH, a hydrocarbyl group having up to 12 carbon atoms or an alkoxyl group having up to 12 carbon atoms; or the two $R^1$ groups attached to a phosphorus atom may together form a ring structure that includes the phosphorus atom; and x is at least 1, preferably 2 or 3.

The various other additives, except for the flame retardant/runaway thermal inhibitor, may together constitute up to 20%, preferably up to 10% of the total weight of the battery electrolyte solution. The flame retardant/runaway thermal inhibitor(s) may constitute up to 80% by weight of the battery electrolyte solution.

The battery electrolyte solution is nonaqueous, by which it is meant that it contains no greater than 0.5% by weight water. The water and alcohol content of the resulting battery electrolyte solution should be as low as possible. A combined water and alcohol content of 2000 ppm or less or of 1000 ppm or less is desired. An advantage of this invention is that batteries containing the battery electrolyte solution of the invention can tolerate such levels of water and alcohols without significant loss of capacity retention. A more preferred combined water and alcohol content is 100 ppm or less, 50 ppm or less, or even 30 ppm or less. The various components can be individually dried or treated before forming the electrolyte solution, and/or the formulated electrolyte solution can be dried or otherwise treated to remove residual water and/or alcohols. The drying or treatment method selected should not degrade or decompose the various components of the electrolyte solution, nor promote any undesired reactions between them. Thermal methods can be used, as can drying agents such as molecular sieves.

The battery electrolyte solution is conveniently prepared by dissolving or dispersing the lithium salt, the vinylene carbonate, 4-vinyl-1,3-dioxolan-2-one or fluoroethylene carbonate and any other additives as may be used into the ester compound(s). The order of mixing is in general not critical.

The battery may be of any type, such as a sodium ion, lithium ion, lithium sulfur, lithium metal, lithium polymer battery or lithium-air battery.

A battery containing the battery electrolyte solution of the invention can be of any useful construction. A typical battery construction includes an anode and cathode, with a separator and the electrolyte solution interposed between the anode and cathode so that ions can migrate through the electrolyte solution between the anode and the cathode. The assembly is generally packaged into a case. The shape of the battery is not limited. The battery may be a cylindrical type containing spirally wound sheet electrodes and separators. The battery may be a cylindrical type having an inside-out structure that includes a combination of pellet electrodes and a separator. The battery may be a plate type containing electrodes and a separator that have been superimposed.

Suitable anode materials include, for example, carbonaceous materials such as natural or artificial graphite, carbonized pitch, carbon fibers, graphitized mesophase microspheres, furnace black, acetylene black, and various other graphitized materials. The carbonaceous materials may be bound together using a binder such as poly(vinylidene fluoride), poly(tetrafluoroethylene), a styrene-butadiene copolymer, an isoprene rubber, poly(vinyl acetate), poly(ethyl methacrylate), polyethylene, or nitrocellulose. Suitable carbonaceous anodes and methods for constructing same are described, for example, in U.S. Pat. No. 7,169,511.

Other suitable anode materials include lithium metal, lithium alloys, other lithium compounds such as a lithium titanate and metal oxides such as $TiO_2$, $SnO_2$ and $SiO_2$.

Suitable cathode materials include transition metal oxides, transition metal/lithium composite oxides, lithium/transition metal composite phosphates, transition metal sulfides, metal oxides, transition metal silicates, sulfur, polysulfides and air. Examples of transition metal oxides include MnO, $V_2O_5$, $V_6O_{13}$, and $TiO_2$. Transition metal/lithium composite oxides include lithium/cobalt composite oxides whose basic composition is approximately $LiCoO_2$, lithium/nickel composite oxides whose basic composition is approximately $LiNiO_2$, and lithium/manganese composite oxides whose basic composition is approximately $LiMn_2O_4$ or $LiMnO_2$. In each of these cases, part of the lithium, cobalt, nickel or manganese can be replaced with one or two metals such as Al, Ti, V, Cr, Fe, Co, Ni, Cu, Zn, Mg, Ga or Zr. Transition metal/lithium composite oxides wherein part of the lithium, cobalt, nickel or manganese has been replaced with one or two metals such as Al, Ti, V, Cr, Mn, Fe, Co, Ni, Cu, Zn, Mg, Ga or Zr also include lithium insertion compounds having the formula $Li_{x+y}M_zMn_{2-y-z}O_4$ wherein the insertion compound has a spinel-like crystal structure, M is a metal such as Al, Ti, V, Cr, Mn, Fe, Co, Ni, Cu, Zn, Mg, Ga or Zr, x is a number greater than or equal to zero and less than 1, y is a number greater than or equal to zero and less than 0.33, z is a number greater than zero and less than about 1, and the potential of the lithium insertion compound is greater than about 4.5 volts versus $Li/Li^+$. Lithium/transition metal composite phosphates include lithium iron phosphate, lithium manganese phosphate, lithium cobalt phosphate, lithium iron manganese phosphate, and the like, as well as those described, for example, in WO 2009/127901 and WO 2009/144600. Examples of useful metal silicates include lithium iron orthosilicate.

The electrodes are each generally in electrical contact with or formed onto a current collector. A suitable current collector for the anode is a metal or metal alloy such as copper, a copper alloy, nickel, a nickel alloy, stainless steel, titanium and the like. Suitable current collectors for the cathode include aluminum, titanium, tantalum, alloys of two or more of these, and the like.

The separator is interposed between the anode and cathode to prevent the anode and cathode from coming into contact with each other and short-circuiting. The separator is conveniently a non-conductive material. It should not be reactive with or soluble in the electrolyte solution or any of the components of the electrolyte solution under operating conditions. Polymeric separators are generally suitable. Examples of suitable polymers for forming the separator include polyethylene, polypropylene, polybutene-1, poly-3-methylpentene, ethylene-propylene copolymers, polytetrafluoroethylene, polystyrene, polymethylmethacrylate, polydimethylsiloxane, polyethersulfones and the like.

The electrolyte solution must be able to permeate through the separator. For this reason, the separator is generally porous, being in the form of a porous sheet, nonwoven or woven fabric or the like. The porosity of the separator is generally 20% or higher, up to as high as 90%. A preferred porosity is from 30 to 75%. The pores are generally no larger than 0.5 microns, and are preferably up to 0.05 microns in their longest dimension. The separator is typically at least one micron thick, and may be up to 50 microns thick. A preferred thickness is from 5 to 30 microns.

The battery is preferably a secondary (rechargeable) battery, more preferably a secondary lithium battery. In such a battery, the discharge reaction includes a dissolution or delithiation of lithium ions from the anode into the electrolyte solution and concurrent incorporation of lithium ions into the cathode. The charging reaction, conversely, includes an incorporation of lithium ions into the anode from the electrolyte solution. Upon charging, lithium ions are reduced on the anode side, at the same time, lithium ions in the cathode material dissolve into the electrolyte solution.

The battery of the invention can be used in industrial applications such as electric vehicles, hybrid electric vehicles, plug-in hybrid electric vehicles, aerospace vehicles and equipment, e-bikes, etc. The battery of the invention is also useful for operating a large number of electrical and electronic devices, such as computers, cameras, video cameras, cell phones, PDAs, MP3 and other music players, tools, televisions, toys, video game players, household appliances, medical devices such as pacemakers and defibrillators, among many others.

The following examples are provided to illustrate the invention, but are not intended to limit the scope thereof. All parts and percentages are by weight unless otherwise indicated.

EXAMPLES 1-2 AND COMPARATIVE BATTERIES A AND B

A control battery electrolyte solution consisting of a 1.0 M solution of $LiPF_6$ in a 50/50 by volume mixture of ethylene carbonate and diethyl carbonate is introduced into a 2025 button cell having a high power $Li_{1.1}(Ni_{1/3}Mn_{1/3}Co_{1/3})_{0.9}O_2$ (NMC) cathode, a graphite anode, and a polyolefin separator. The button cell is designated as Comparative Battery A. The bulk density of the electrolyte solution is 1.3 g/mL at 25° C. Full cycle discharge curves for Comparative Battery A are produced using a Maccor 4000 battery tester, using in order (following an SEI formation cycle), discharge rates of 0.5 C, 0.1 C, 0.33 C, 1 C, 2 C, 3 C, 5 C, 8 C, 10 C, 12 C, 15 C, 20 C, and finally 0.1 C. A representative discharge curve from that testing is indicated as curve "A" in FIG. 1.

A second identical cell is prepared (also designated Comparative Battery A). Cyclability testing is performed and discharge curves for this cell are produced using the same tester, using an initial 0.1 C discharge rate, followed by a repeating pattern of 25 1 C discharge cycles followed by another 0.1 C discharge cycle, until 100 discharge cycles have been performed. A representative discharge curve from that cyclability testing is indicated as curve "A" in FIG. 2.

Comparative Battery B is prepared in the same manner, except that the electrolyte solution is a 1.0 M solution of $LiPF_6$ in 98 parts of a 50/50 by volume mixture of ethylene carbonate and diethyl carbonate and 2 parts of vinylene carbonate. Cyclability testing is performed in the same manner as for Comparative Battery A. A representative discharge curve from that cyclability testing is indicated as curve "B" in FIG. 2.

Battery Example 1 is made in the same manner, except that the electrolyte solution consists of a 1.0 M solution of $LiPF_6$ in a mixture of 98% by weight methoxyethyl acetate and 2 weight percent vinylene carbonate. Full cycle discharge testing is performed on Battery Example 1 in the same manner as is Comparative Battery A. A representative discharge curve from the full cycle discharge testing is indicated as curve 1 in FIG. 1. Cyclability testing is performed in the same manner as for Comparative Batteries A and B. A representative discharge curve from the cyclability testing is indicated as curve 1 in FIG. 1.

Battery Example 2 is made in the same manner, except that the electrolyte solution consists of a 1.0 M solution of $LiPF_6$ in a mixture of 98% by weight ethoxyethyl acetate and 2 weight percent vinylene carbonate. Full cycle discharge testing is performed on Battery Example 2 in the same manner as is Comparative Battery A. A representative discharge curve from the full cycle discharge testing is indicated as curve 2 in FIG. 1.

As shown in FIG. 1, Battery Example 1 (containing methoxyethyl acetate plus 2% vinylene carbonate as solvent) performs equivalently to or better than Comparative Battery A on the full cycle discharge testing. Specific capacity is greater for Battery Example 1 than for Comparative Battery A at discharge rates below 3 C, and very close or equal to Comparative Battery A at all higher discharge rates. This result is highly surprising, because the ethylene carbonate/diethyl carbonate solvent mixture of Comparative Battery A represents the state-of-the-art in lithium batteries and because, unlike the components in Comparative Battery A, methoxyethyl acetate is not known to form an SEI layer. Battery Example 2 performs very similarly to Battery Example 1 at discharge rates of 5 C and below.

Figure 2:
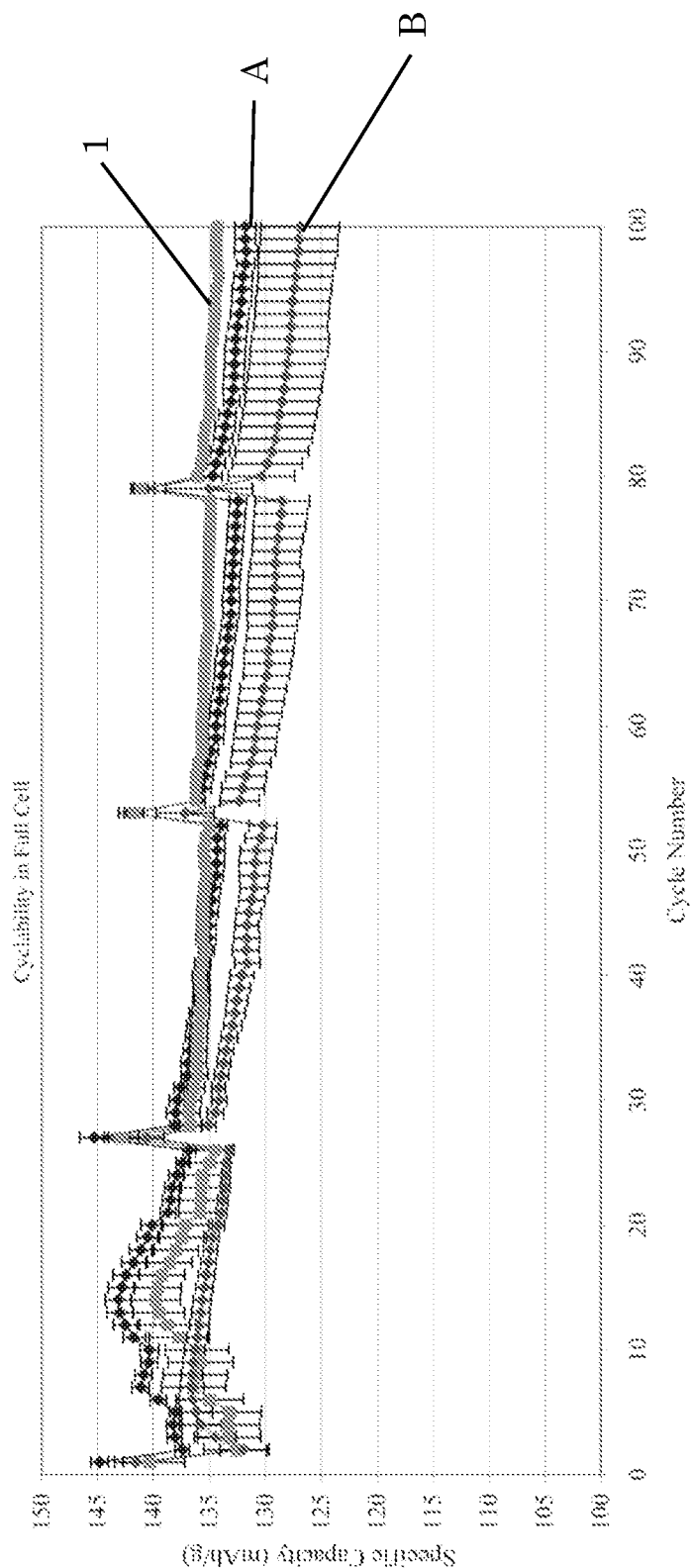
FIG. 2 is a graph of cyclability discharge curves for a battery in accordance with the invention (Ex. 1) and two comparative batteries (Comparative Batteries A and B).

FIG. 2 shows that Battery Example 1 retains its specific capacity better than does either of the Comparative Batteries over cyclability testing. In this test, Comparative Battery A exhibits a slightly higher specific capacity early in the cyclabililty test (before the $20^{th}$ cycle), but its specific capacity declines more rapidly than does that of Battery Example 1. After about 50 cycles, the specific capacity of Battery Example 1 surpasses that of Comparative Battery A. From the $38^{th}$ to the $100^{th}$ cycle, Battery Example 1 loses only 0.49% of its specific capacity, whereas Comparative Battery A loses 2.86% of its capacity over that span. In this test, Battery Example 1 is indicated as having a longer useful life than Comparative Battery A at equivalent or better specific capacity.

The results for Comparative Battery B show the effect of adding 2% vinylene carbonate into the ethylene carbonate/diethyl carbonate solvent system. The specific capacity is lower than those of both Comparative Battery A and Battery Example 1, and the rate of capacity loss is significantly higher. The results from Comparative Battery B show that the addition of vinylene carbonate into an ethylene carbonate/diethyl carbonate solvent system actually hurts the battery performance, even though vinylene carbonate is understood to function as an SEI formation additive.

EXAMPLE 3

Battery Examples 3A-3E are prepared in the same general manner as Comparative Battery A, except the electrolyte solution is a 1.0 M solution of $LiPF_6$ in a mixture of methoxyethyl acetate and vinylene carbonate. The ratios of methoxyethyl acetate and vinylene carbonate for these examples are as follows:
  Example 3A: 99.5% methoxyethyl acetate and 0.5% vinylene carbonate.
  Example 3B: 99% methoxyethyl acetate and 1% vinylene carbonate.
  Example 3C: 98% methoxyethyl acetate and 2% vinylene carbonate.
  Example 3D: 95% methoxyethyl acetate and 5% vinylene carbonate.
  Example 3E: 90% methoxyethyl acetate and 10% vinylene carbonate.

Full cycle discharge cycling is performed for each of Battery Examples 3A-3E in the manner described before. Representative discharge curves from the full cycle discharge testing of each of these batteries are indicated as curves 3A-3E, respectively, in FIG. 3.

Batteries similar to Comparative Batteries A and B are made and tested for reference. A representative discharge curve from the full cycle discharge testing of each of these comparative batteries are indicated as curves A and B in FIG. 3.

Figure 3:
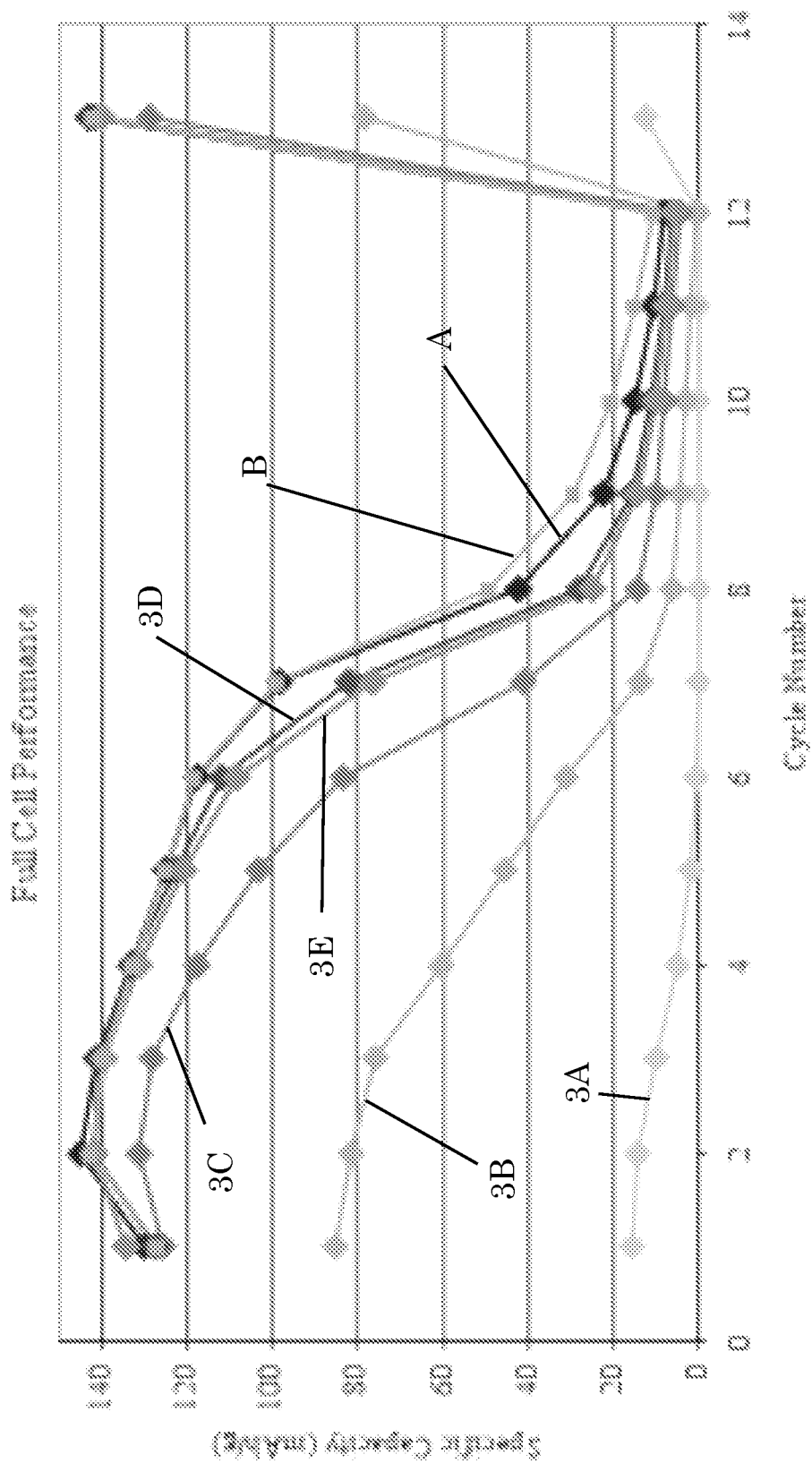
FIG. 3 is a graph of full cycle discharge curves for five batteries in accordance with the invention (Ex. 3A through 3E) and two comparative batteries (Comparative Batteries A and B).

Curves 3A-3E indicate the effect of adding vinylene carbonate to a methoxyethyl acetate battery electrolyte solution. The addition of higher amounts of vinylene carbonate leads to much higher battery capacity across the entire test cycle. This result is contrary to the result obtained when vinylene carbonate is added to an ethylene carbonate/diethylcarbonate solution (as in Comparative Battery B), where no gain in discharge capacity is seen. As shown in FIG. 3, the addition of 1% vinylene carbonate to a methoxyethyl acetate electrolyte solution leads to a very significant improvement over the 0.5% vinylene carbonate case. A further doubling of the vinylene carbonate to 2% leads to another very substantial improvement. Further increases in vinylene carbonate content to 10% provide smaller improvements in specific capacity in this test. A battery similar to Examples 3A-3E, but which contains no vinylene carbonate, fails to charge and exhibits essentially no specific capacity.

EXAMPLE 4

Battery Example 4 is prepared in the same general manner as Comparative Battery A, except the electrolyte solution is a 1.0 M solution of $LiPF_6$ in a mixture of 98% by weight 2-methoxy-1-methylethyl acetate and 2% by weight vinylene carbonate. The 2-methoxy-1-methylethyl acetate is a commercially available material, Dowanol™ PMA, which has been distilled to reduce the water and residual alcohol contents each to below 50 ppm. This material has a freezing temperature of −87° C., a flash point of 10° C. higher than ethylene carbonate, and has a bulk density of only 0.97 g/mL compared with an ethylene carbonate density of 1.321 g/mL. The bulk density of the electrolyte solution is only 1.1 g/mL. Full cycle discharge curves for Battery Example 4 and Comparative Battery A are produced as described before, with representative curves being designated by "4" and "A", respectively, in FIG. 4.

Figure 4:
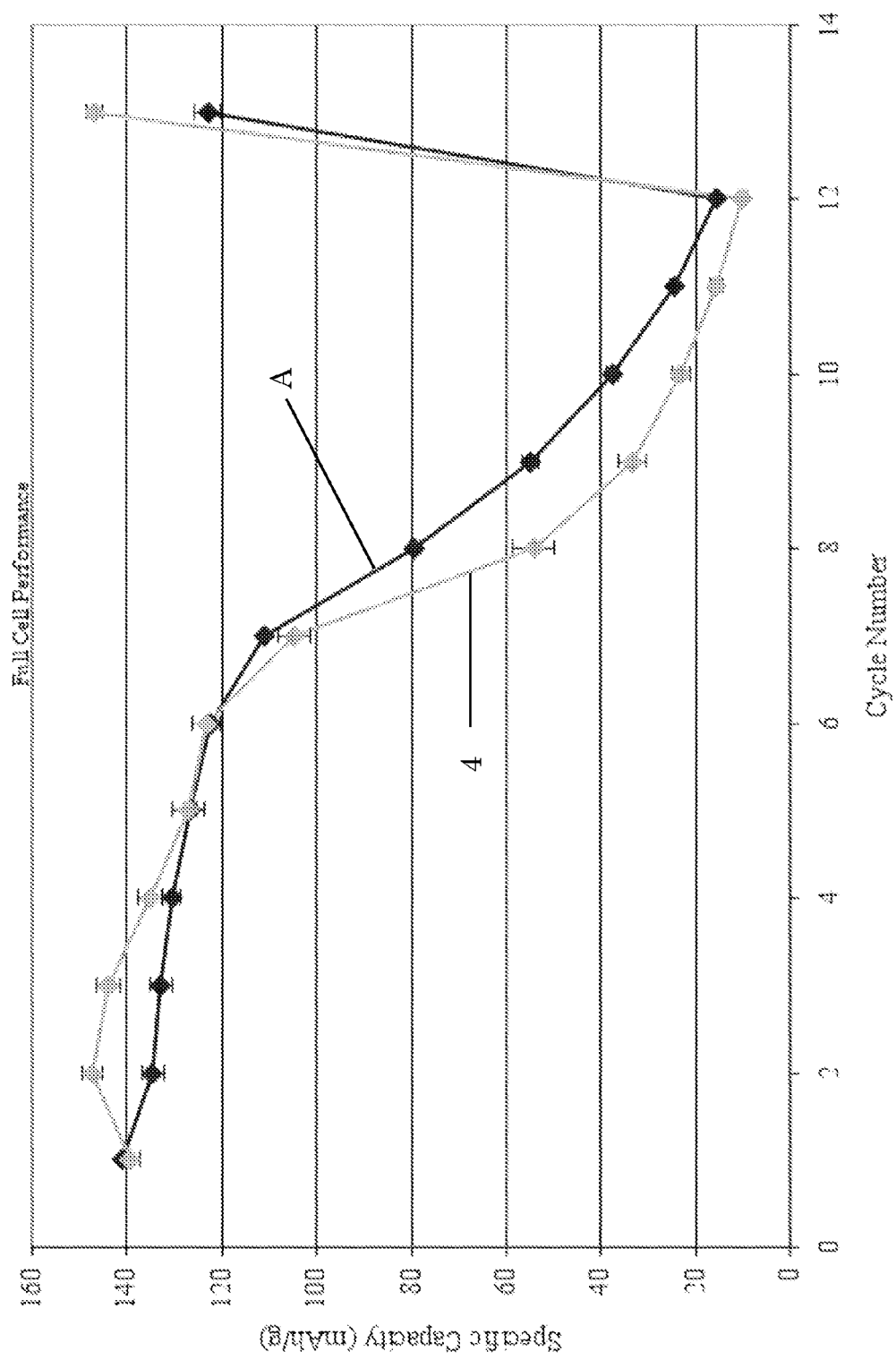
FIG. 4 is a graph of full cycle discharge curves for a batteries in accordance with the invention (Ex. 4) and a comparative battery (Comparative Battery A).

As shown in FIG. 4, the substitution of 2-methoxy-1-methylethyl acetate (with 2% vinylene carbonate) for a 1:1 mixture of ethylene carbonate and diethyl carbonate leads to a battery with comparable performance.

EXAMPLES 5-9 AND COMPARATIVE BATTERIES C-J

Battery Example 5 is prepared in the same general manner as Comparative Battery A, except the electrolyte solution is a 1.0 M solution of $LiPF_6$ in a mixture of 95% by weight methoxyethyl acetate and 5% by weight vinylene carbonate.

Battery Example 6 is prepared in the same general manner as Comparative Battery A, except the electrolyte solution is a 1.0 M solution of $LiPF_6$ in a mixture of 95% by weight methoxyethyl acetate and 5% by weight 4-vinyl-1,3-dioxolan-2-one.

Comparative Battery C is prepared in the same general manner as Comparative Battery A, except the electrolyte solution is a 1.0 M solution of $LiPF_6$ in a mixture of 95% by weight methoxyethyl acetate and 5% by weight vinyl acetate.

Comparative Battery D is prepared in the same general manner as Comparative Battery A, except the electrolyte solution is a 1.0 M solution of $LiPF_6$ in a mixture of 95% by weight methoxyethyl acetate and 5% by weight allyl methyl carbonate.

Comparative Battery E is prepared in the same general manner as Comparative Battery A, except the electrolyte solution is a 1.0 M solution of $LiPF_6$ in a mixture of 95% by weight methoxyethyl acetate and 5% by weight propargyl benzene sulfonate.

Comparative Battery F is prepared in the same general manner as Comparative Battery A, except the electrolyte solution is a 1.0 M solution of $LiPF_6$ in a mixture of 95% by weight methoxyethyl acetate and 5% by weight methyl chloroformate.

Figure 5:
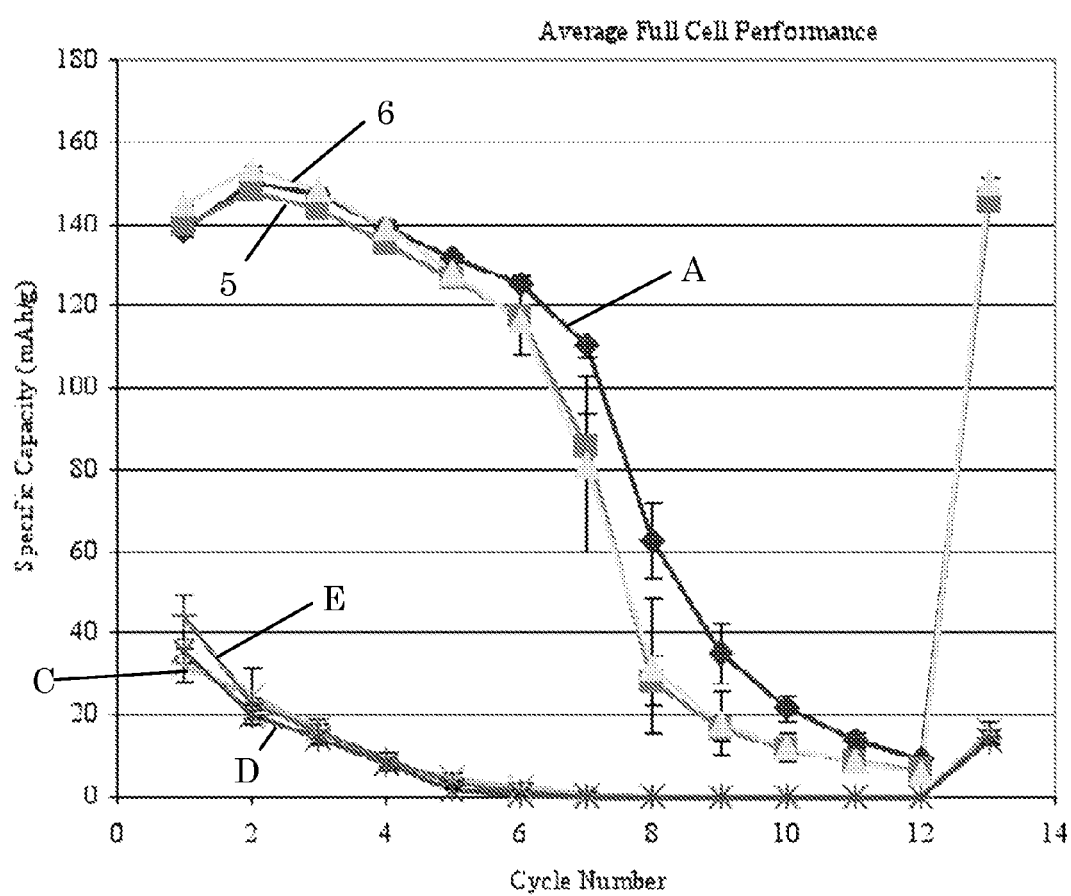
FIG. 5 is a graph of full cycle discharge curves for two batteries in accordance with the invention (Ex. 5 and 6) and four comparative batteries (Comparative Batteries A, C, D and E).

Full cycle discharge curves for Battery Examples 5 and 6 and Comparative Batteries A, C, D, and E are obtained as described before. Representative curves are shown in FIG. 5 as curves 5, 6, A, C, D, and E, respectively. Comparative Battery F does not hold a charge at 4.2 volts and is not tested.

The results shown in FIG. 5 illustrate how the selection of SEI additive is important to performance in ester-based electrolyte solutions. Vinylene carbonate and 4-vinyl-1,3-dioxolan-2-one perform very well, and the batteries containing them in the electrolyte solution perform comparably to Comparative Battery A, which represents the state-of-the-art. The remaining SEI additives do not lead to good battery performance, even though all except methyl chloroformate are polymerizable types, as are vinylene carbonate and 4-vinyl-1,3-dioxolan-2-one. These results indicate that the performance of SEI additives in methoxyethyl acetate electrolyte solutions is not easily predictable, and the mechanism(s) which lead to good battery performance are not well understood with ester-based solvent systems.

Comparative Batteries G-J are formed in the same manner as Comparative Battery A, except the electrolyte solution in each case is a 1.0 M solution of $LiPF_6$ in a solvent mixture as follows:

Comparative Battery G: a 90/10 by weight mixture of methoxyethyl acetate and ethylene carbonate.

Comparative Battery H: a 95/5 by weight mixture of methoxyethyl acetate and ethylene carbonate.

Comparative Battery I: a 98/2 by weight mixture of methoxyethyl acetate and ethylene carbonate.

Comparative Battery J: a 99/1 by weight mixture of methoxyethyl acetate and ethylene carbonate.

Figure 6:
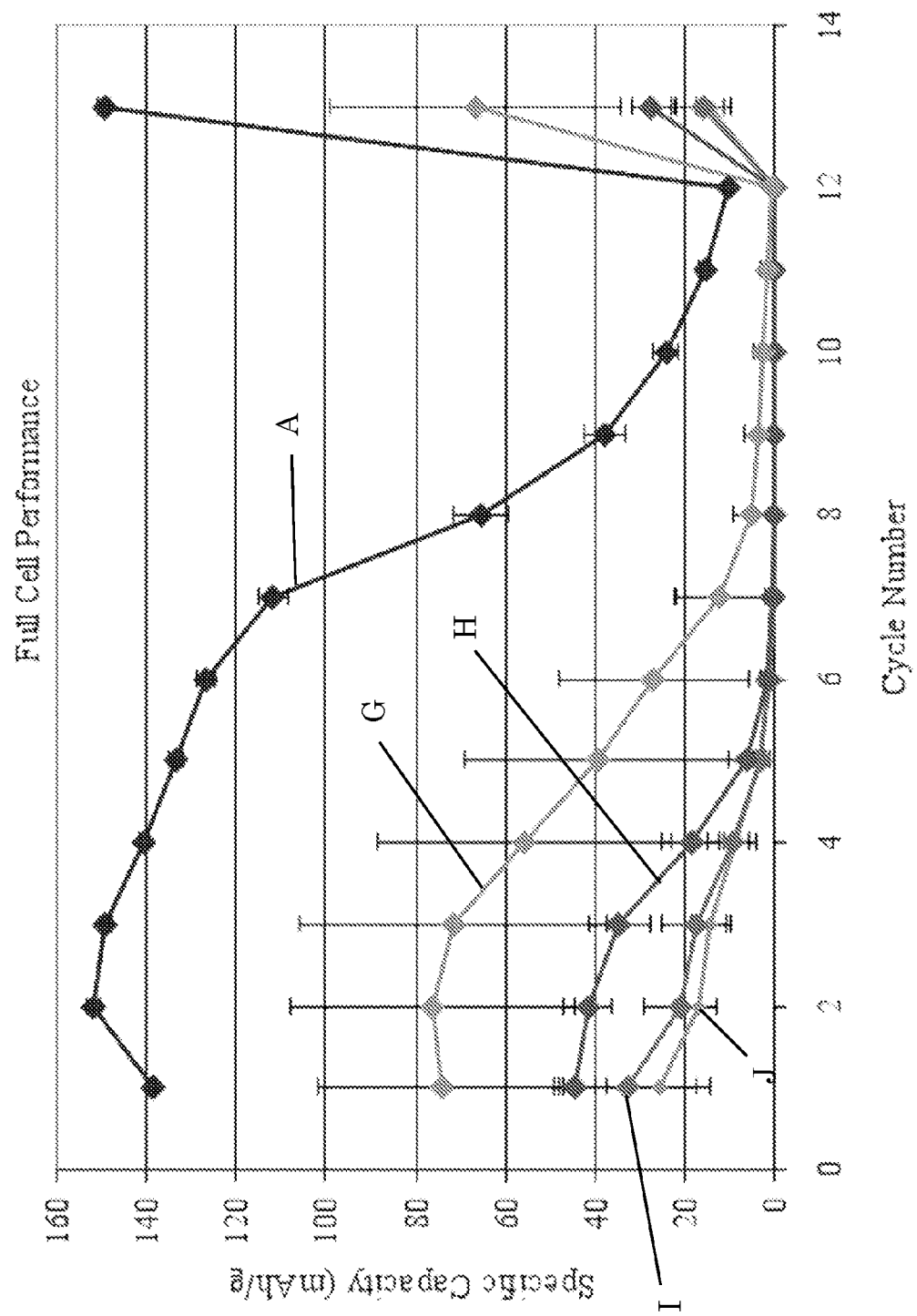
FIG. 6 is a graph of full cycle discharge curves for five comparative batteries (Comparative Batteries A, G, H, I and J).

Full cycle discharge curves for Comparative Batteries G-J are obtained as described before. Representative curves are shown in FIG. 6 as curves G, H, I and J, respectively. A representative discharge curve for Comparative Battery A is also shown.

The results shown in Table 6 indicate that, contrary to the suggestion in US Published Patent Application 2008-0241699, ethylene carbonate by itself appears to perform poorly as an SEI former when added in small amounts to an ester solvent system. The poor SEI formation is manifested by the low specific capacities of Comparative Batteries G-J.

Battery Examples 7-9 are formed in the same manner as Comparative Battery A, except the electrolyte solution in each case is a 1.0 M solution of $LiPF_6$ in a solvent mixture as follows:

Battery Example 7: 100 parts of a 50/50 by weight mixture of methoxyethyl acetate and ethylene carbonate are mixed with 2 parts of vinylene carbonate.

Battery Example 8: 100 parts of a 75/25 by weight mixture of methoxyethyl acetate and ethylene carbonate are mixed with 2 parts of vinylene carbonate.

Battery Example 9: 100 parts of a 50/50 by weight mixture of ethylene carbonate and diethyl carbonate are mixed with 10 parts of methoxyethyl acetate and 2 parts of vinylene carbonate.

Figure 7:
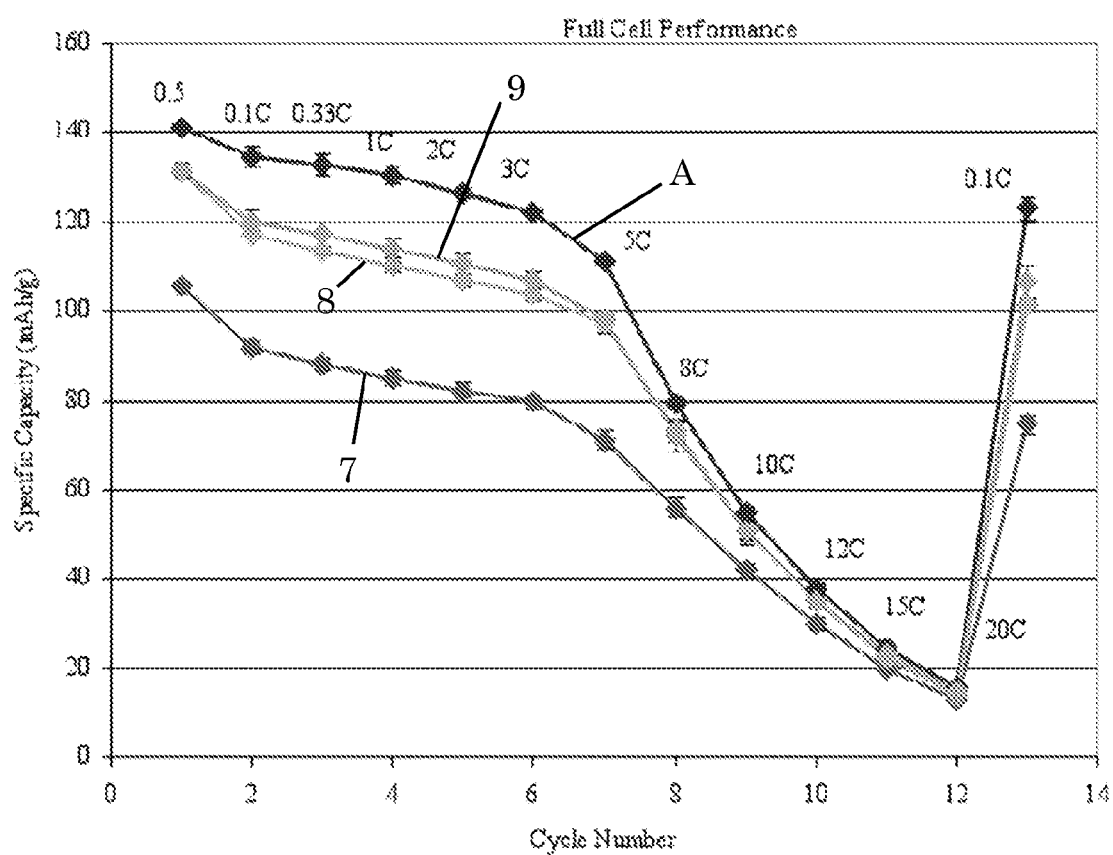
FIG. 7 is a graph of full cycle discharge curves for three batteries in accordance with the invention (Ex. 7, 8 and 9) and a comparative battery (Comparative Battery A).

Full cycle discharge curves for Battery Examples 7-9 are obtained as described before. Representative curves are shown in FIG. 7 as curves 7, 8 and 9, respectively. A representative discharge curve for Comparative Battery A is also shown.

The results shown in Table 7 indicate that mixtures of a carbonate solvent such as ethylene carbonate and an ester such as methoxyethyl acetate can form useful battery electrolyte solvents, if an SEI former such as vinylene carbonate is also present. However, the performance of Battery Examples 7-9 is not as good as that of Examples 1, 2, 3C, 4, or 5 of the invention, which suggests that the inclusion of a cyclic alkylene carbonate is less preferred.

EXAMPLES 10-12 AND COMPARATIVE BATTERIES K-O

Battery Example 10 is prepared in the same general manner as Comparative Battery A, except the electrolyte solution is a 1.0 M solution of $LiPF_6$ in a mixture of 95% by weight of the Dowanol™ PMA 2-methoxy-1-methylethyl acetate which has been distilled to reduce the water and residual alcohol contents each to below 50 ppm, and 5% by weight vinylene carbonate.

Battery Example 11 is prepared in the same general manner as Comparative Battery A, except the electrolyte solution is a 1.0 M solution of $LiPF_6$ in a mixture of 95% by weight of the distilled Dowanol™ PMA and 5% by weight 4-vinyl-1,3-dioxolan-2-one.

Battery Example 12 is prepared in the same general manner as Comparative Battery A, except the electrolyte solution is a 1.0 M solution of $LiPF_6$ in a mixture of 95% by weight of the distilled Dowanol™ PMA and 5% by weight fluoroethylene carbonate.

Comparative Battery K is prepared in the same general manner as Comparative Battery A, except the electrolyte solution is a 1.0 M solution of $LiPF_6$ in a mixture of 95% by weight of the distilled Dowanol™ PMA and 5% by weight 1,3-propane sultone.

Comparative Battery L is prepared in the same general manner as Comparative Battery A, except the electrolyte solution is a 1.0 M solution of $LiPF_6$ in a mixture of 95% by weight of the distilled Dowanol™ PMA and 5% by weight propargyl benzene sulfonate.

Comparative Battery M is prepared in the same general manner as Comparative Battery A, except the electrolyte solution is a 1.0 M solution of $LiPF_6$ in a mixture of 95% by weight of the distilled Dowanol™ PMA and 5% by weight allyl methyl carbonate.

Comparative Battery N is prepared in the same general manner as Comparative Battery A, except the electrolyte solution is a 1.0 M solution of $LiPF_6$ in a mixture of 98% by weight of the distilled Dowanol™ PMA and 2% by weight 1,3-propane sultone Comparative Battery 0 is prepared in the same general manner as Comparative Battery A, except the electrolyte solution is a 1.0 M solution of $LiPF_6$ in a mixture of 95% by weight of the distilled Dowanol™ PMA and 5% by weight vinyl acetate.

Full cycle discharge curves for Battery Examples 10-12 and Comparative Batteries A, and K-O are obtained as described before. Representative curves are shown in FIG. 8 as curves 10, 11, 12, A, K, L, M, N and O, respectively.

Figure 8:
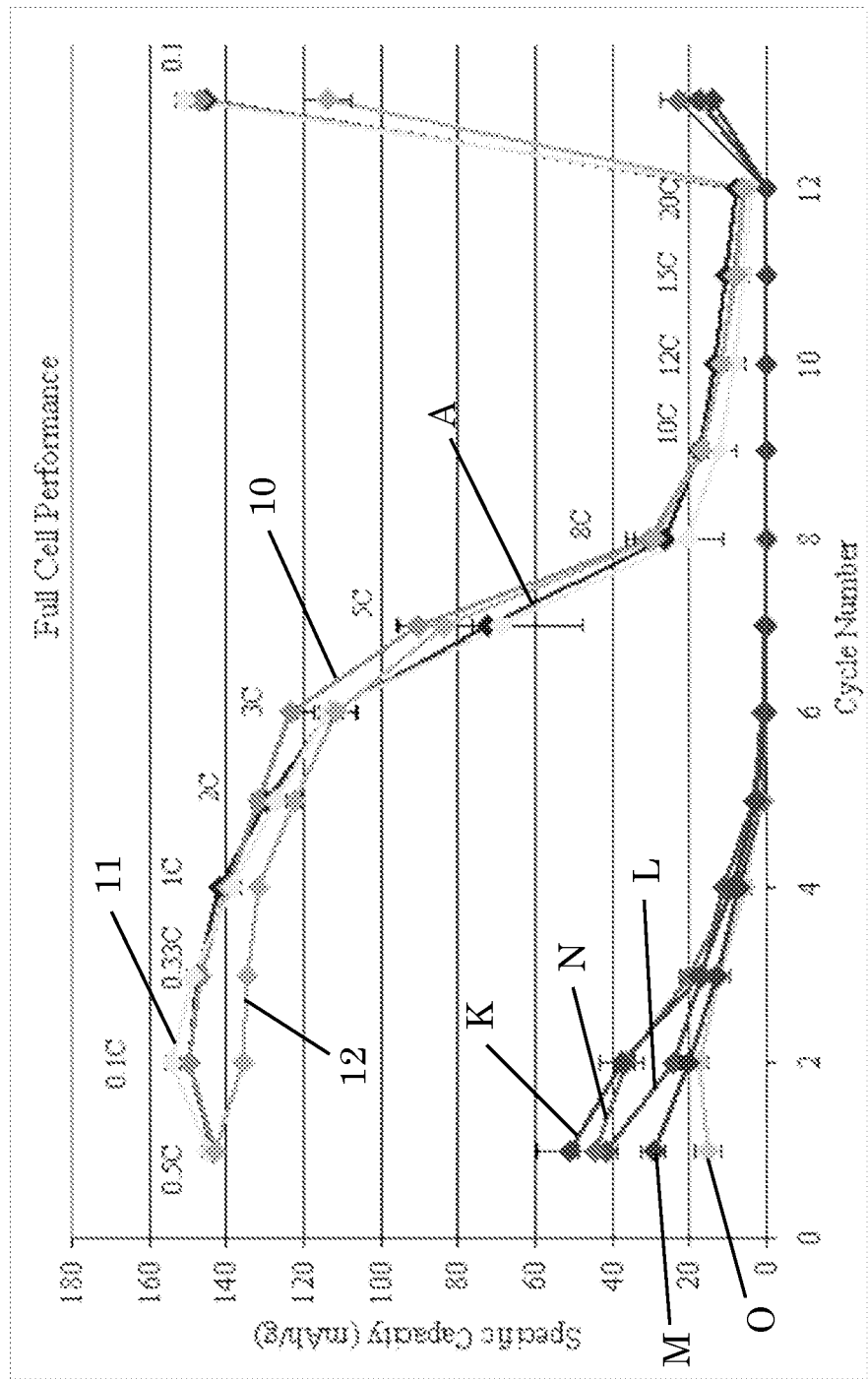
FIG. 8 is a graph of full cycle discharge curves for three batteries in accordance with the invention (Ex. 10, 11 and 12) and six comparative batteries (Comparative Batteries A, K, L, M, N and O).

The results shown in FIG. 8 illustrate how the selection of SEI additive is important to performance in a 2-methoxy-1-methylethyl acetate-based electrolyte solution. Vinylene carbonate, 4-vinyl-1,3-dioxolan-2-one and fluoroethylene carbonate perform very well, and the batteries containing them in the electrolyte solution perform comparably to Comparative Battery A, which represents the state-of-the-art. The remaining SEI additives do not lead to good battery performance. These results indicate that the performance of SEI additives in 2-methoxy-1-methylethyl acetate electrolyte solutions is not easily predictable, and the mechanism(s) which lead to good battery performance are not well understood with this solvent system.

Comparative Batteries P1, P2 and P3

Comparative Battery P1 is prepared in the same general manner as Comparative Battery A, except the electrolyte solution is a 1.0 M solution of $LiPF_6$ in 98 parts of a 75/25 by volume mixture of ethoxymethyl ethyl sulfone and methyl isobutyryl acetate, and 2 parts of vinylene carbonate.

Comparative Battery P2 is prepared in the same general manner as Comparative Battery A, except the electrolyte solution is a 1.0 M solution of $LiPF_6$ in 98 parts of a 50/50 by volume mixture of ethoxymethyl ethyl sulfone and methyl isobutyryl acetate, and 2 parts of vinylene carbonate.

Comparative Battery P3 is prepared in the same general manner as Comparative Battery A, except the electrolyte solution is a 1.0 M solution of $LiPF_6$ in 98 parts of a 25/75 by volume mixture of ethoxymethyl ethyl sulfone and methyl isobutyryl acetate, and 2 parts of vinylene carbonate.

Figure 9:
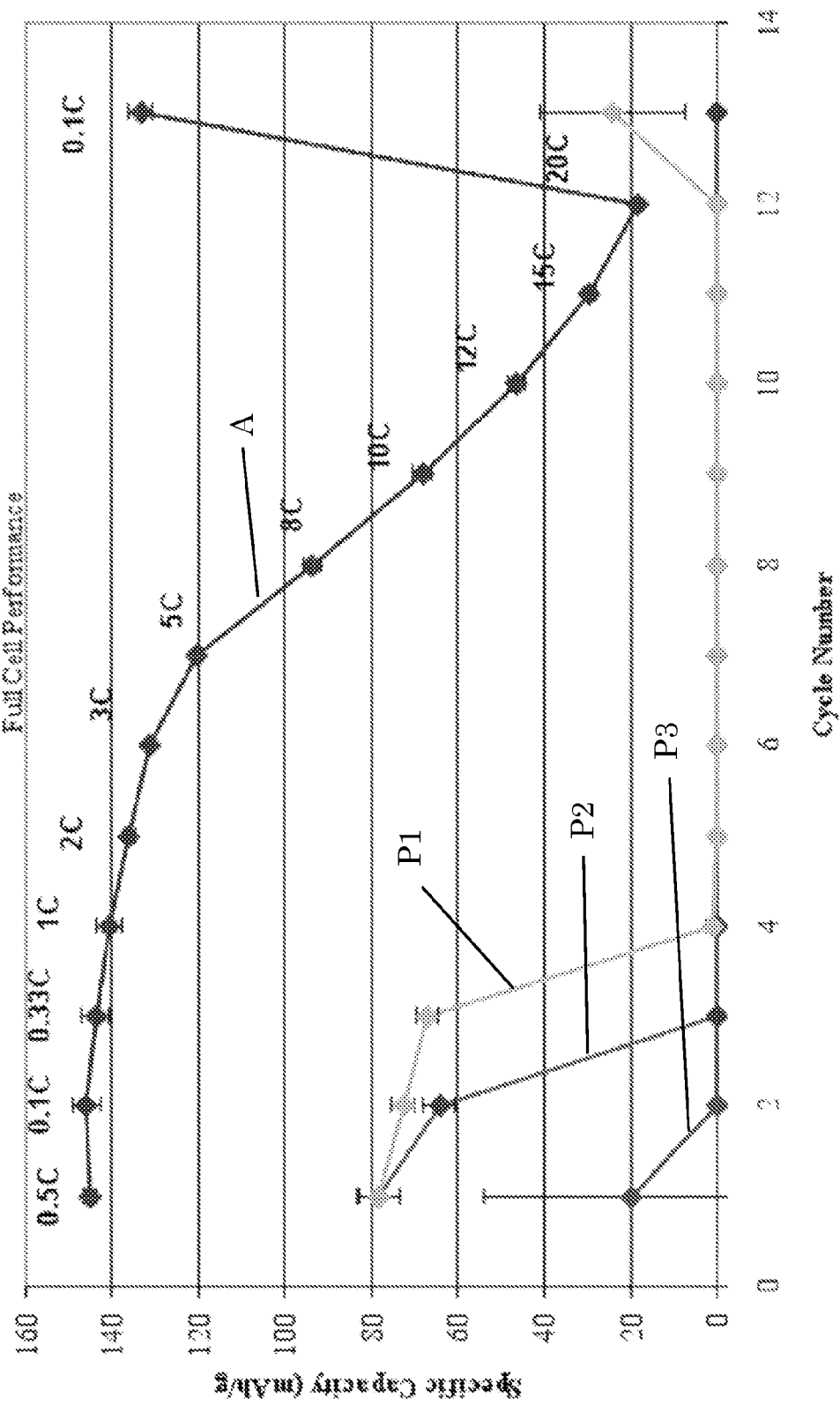
FIG. 9 is a graph of full cycle discharge curves for four comparative batteries (Comparative Batteries A, P1, P2 and P3).

Full cycle discharge curves for Comparative Batteries A and P1-P3 are obtained as described before. Representative curves are shown in FIG. 9 as curves A, P1, P2, and P3, respectively.

These results show that methyl isobutyryl acetate strongly diminishes battery performance, even when used in conjunction with a known battery electrolyte solvent (ethoxymethyl ethyl sulfone) and vinylene carbonate, and underscore the unpredictability of candidate solvent performance.

EXAMPLES 13-15 AND COMPARATIVE BATTERIES Q1 AND Q2

Battery Example 13 is prepared in the same general manner as Comparative Battery A, except the electrolyte solution is a 1.0 M solution of $LiPF_6$ in 98 parts of a 25/75 by volume mixture of ethoxymethyl ethyl sulfone and 2-ethoxyethyl acetate, and 2 parts of vinylene carbonate.

Battery Example 14 is prepared in the same general manner as Comparative Battery A, except the electrolyte solution is a 1.0 M solution of $LiPF_6$ in 98 parts of a 50/50 by volume mixture of ethoxymethyl ethyl sulfone and 2-ethoxyethyl acetate, and 2 parts of vinylene carbonate.

Battery Example 15 is prepared in the same general manner as Comparative Battery A, except the electrolyte solution is a 1.0 M solution of $LiPF_6$ in 98 parts of a 75/25 by volume mixture of ethoxymethyl ethyl sulfone and 2-ethoxyethyl acetate, and 2 parts of vinylene carbonate.

Comparative Battery Q1 is prepared in the same general manner as Comparative Battery A, except the electrolyte solution is a 1.0 M solution of $LiPF_6$ in 98 parts of a 25/75 by volume mixture of ethoxymethyl ethyl sulfone and diethyl oxalate, and 2 parts of vinylene carbonate.

Comparative Battery Q2 is prepared in the same general manner as Comparative Battery A, except the electrolyte solution is a 1.0 M solution of $LiPF_6$ in 98 parts of a 50/50 by volume mixture of ethoxymethyl ethyl sulfone and diethyl oxalate, and 2 parts of vinylene carbonate.

Figure 10:
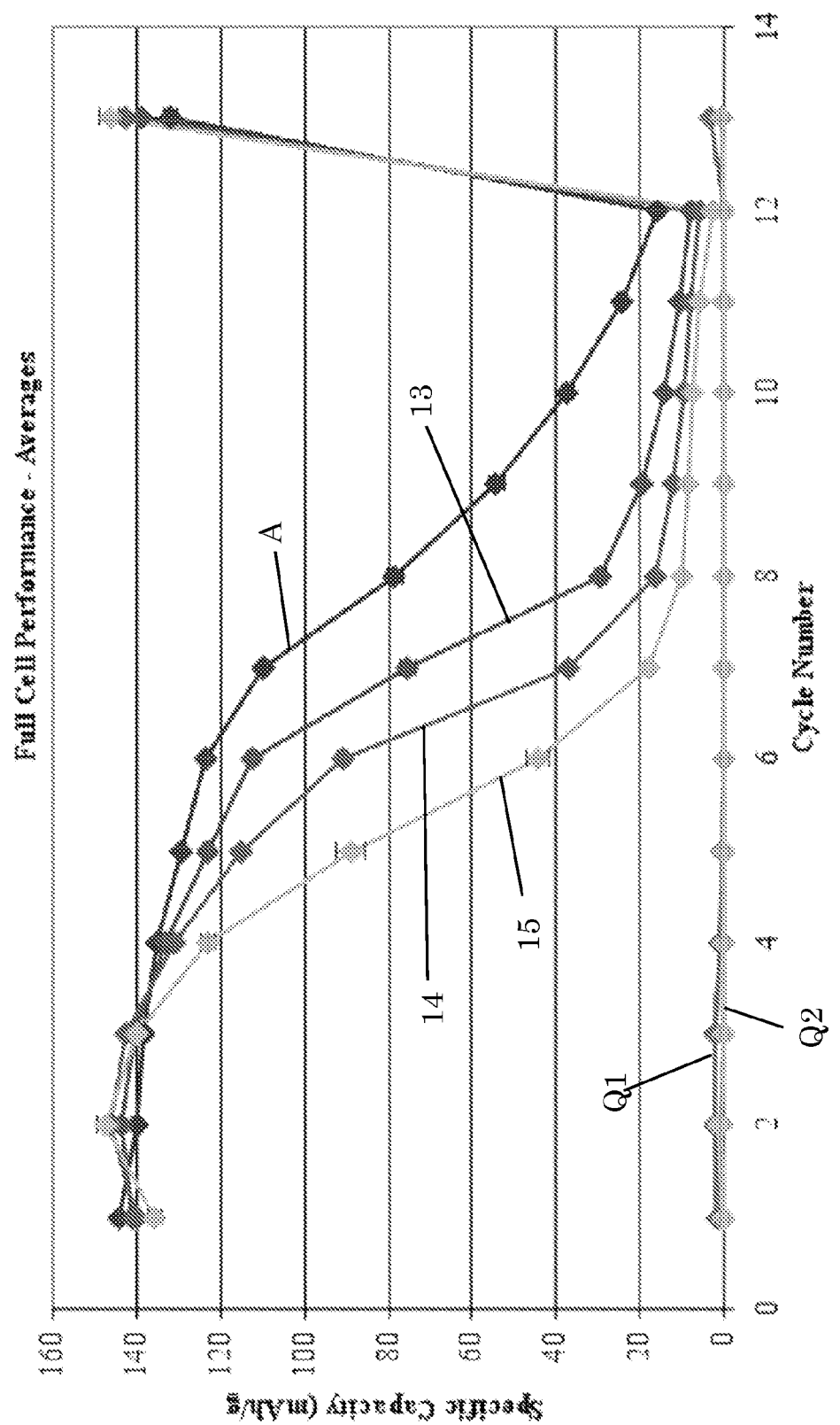
FIG. 10 is a graph of full cycle discharge curves for three batteries in accordance with the invention (Ex. 13, 14 and 15) and three comparative batteries (Comparative Batteries A, Q1 and Q2).

Full cycle discharge curves for Battery Examples 13-15 and Comparative Batteries A, and Q1 and Q2 are obtained as described before. Representative curves are shown in FIG. 10 as curves 13, 14, 15, A, Q1 and Q2, respectively.

These results show that diethyl oxalate strongly diminishes battery performance, even when used in conjunction with a known battery electrolyte solvent (ethoxymethyl ethyl sulfone) and vinylene carbonate. 2-Ethoxyethyl acetate, on the other hand, works well in combination with ethoxymethyl ethyl sulfone and vinylene carbonate.

Comparative Batteries R1, R2 and R3

Comparative Battery R1 is prepared in the same general manner as Comparative Battery A, except the electrolyte solution is a 1.0 M solution of $LiPF_6$ in 98 parts of a 75/25 by volume mixture of ethoxymethyl ethyl sulfone and gamma-valerolactone, and 2 parts of vinylene carbonate.

Comparative Battery R2 is prepared in the same general manner as Comparative Battery A, except the electrolyte solution is a 1.0 M solution of $LiPF_6$ in 98 parts of a 50/50 by volume mixture of ethoxymethyl ethyl sulfone and gamma-valerolactone, and 2 parts of vinylene carbonate.

Comparative Battery R3 is prepared in the same general manner as Comparative Battery A, except the electrolyte solution is a 1.0 M solution of $LiPF_6$ in 98 parts of a 25/75 by volume mixture of ethoxymethyl ethyl sulfone and gamma-valerolactone, and 2 parts of vinylene carbonate.

Figure 11:
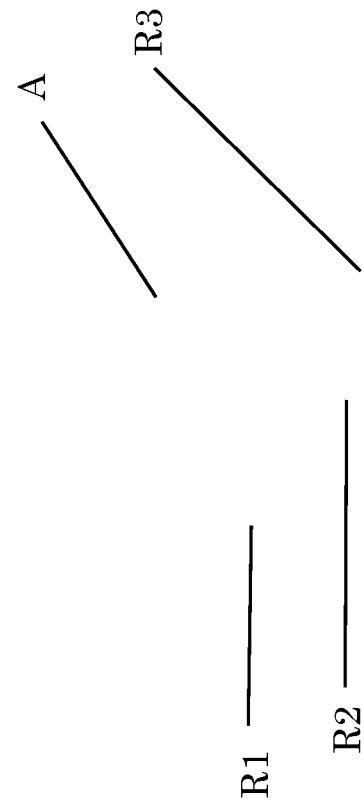
FIG. 11 is a graph of full cycle discharge curves for four comparative batteries (Comparative Batteries A, $R^1$, $R^2$ and $R^3$).

Full cycle discharge curves for Comparative Batteries A and R1-R3 are obtained as described before. Representative curves are shown in FIG. 11 as curves A, R1, R2, and R3, respectively.

These results show that gamma valerolactone diminishes battery performance, even when used in conjunction with a known battery electrolyte solvent (ethoxymethyl ethyl sulfone) and vinylene carbonate. These results again underscore the unpredictability of candidate solvent performance.

EXAMPLES 16-17 AND COMPARATIVE BATTERY S

Battery Example 16 is prepared in the same general manner as Comparative Battery A, except the electrolyte solution is a 1.0 M solution of $LiPF_6$ in 98 parts of butyl acetate and 2 parts of vinylene carbonate.

Battery Example 17 is prepared in the same general manner as Comparative Battery A, except the electrolyte solution is a 1.0 M solution of $LiPF_6$ in 98 parts of hexyl acetate and 2 parts of vinylene carbonate.

Comparative Battery S is prepared in the same general manner as Comparative Battery A, except the electrolyte solution is a 1.0 M solution of $LiPF_6$ in 98 parts of octyl acetate and 2 parts of vinylene carbonate.

Figure 12:
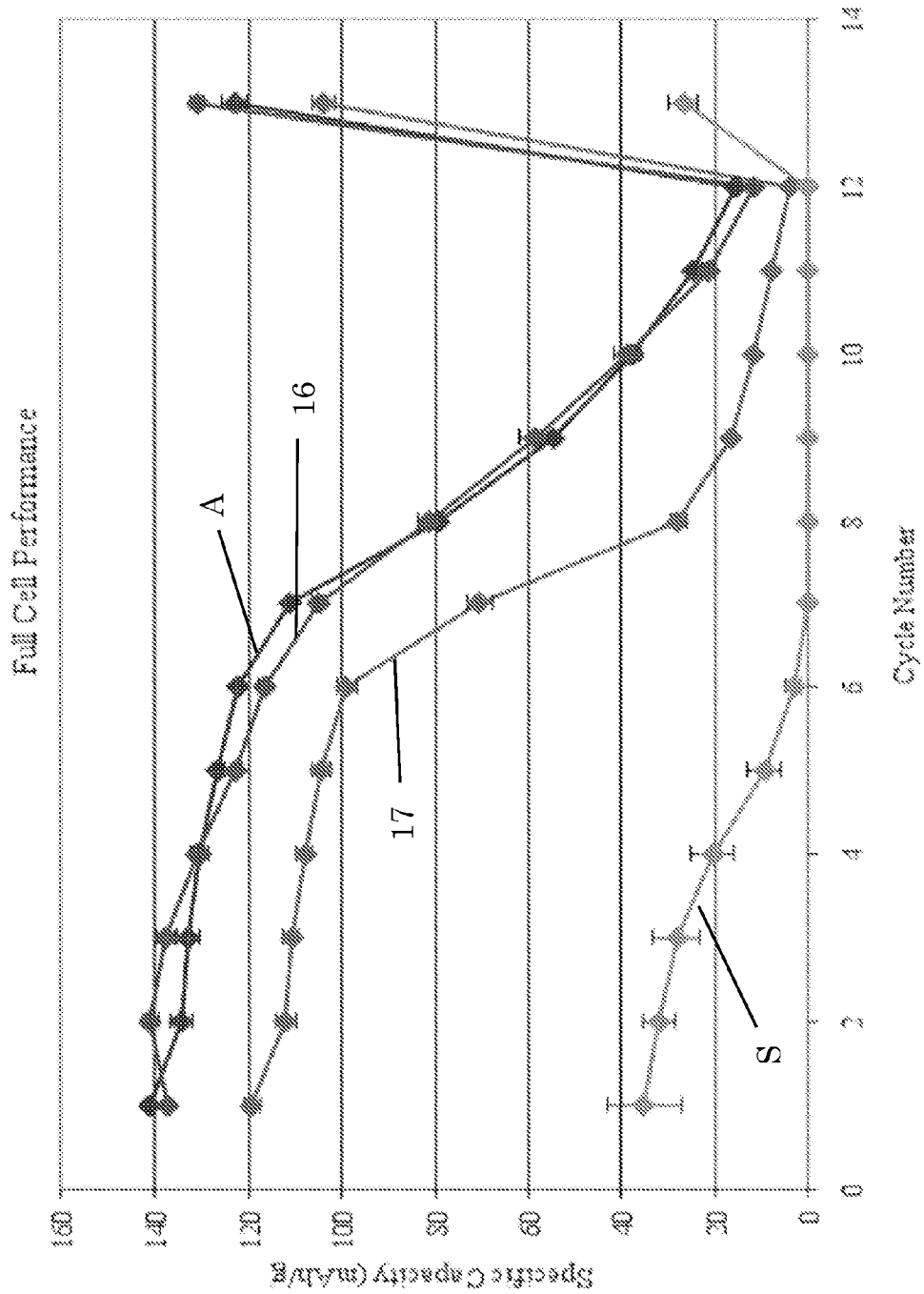
FIG. 12 is a graph of full cycle discharge curves for two batteries in accordance with the invention (Ex. 16 and 17) and two comparative batteries (Comparative Batteries A and S).

Full cycle discharge curves Battery Examples 16 and 17 and Comparative Batteries A and S are obtained as described before. Representative curves are shown in FIG. 12 as curves 16, 17, A and S, respectively.

These results show that butyl acetate in conjunction with vinylene carbonate performs comparably with the state-of-the-art ethylene carbonate/diethyl carbonate-based electrolyte solution. Hexyl acetate in conjunction with vinylene carbonate performs slightly less well. Octyl acetate, however, performs much more poorly, even when vinylene carbonate is present.

EXAMPLES 18-22 AND COMPARATIVE SAMPLE T

A control battery electrolyte solution consisting of a 1.0 M solution of $LiPF_6$ in a 50/50 by volume mixture of ethylene carbonate and diethyl carbonate is introduced into a 18650 spiral-wound cell. The cell is designated as Comparative Battery T. This cell contains 4000 microliters of battery electrolyte solution and has a capacity of 2000 mAh.

Battery Example 18 is made in the same manner, except that the electrolyte solution consists of a 1.0 M solution of $LiPF_6$ in a mixture of 98% by weight methoxyethyl acetate and 2 weight percent vinylene carbonate. Battery Example 18 performs less well than Comparative Battery T, and demonstrates some evolution of gas during cycling.

Battery Example 19 is made in the same manner, except that the electrolyte solution consists of a 1.0 M solution of $LiPF_6$ in a mixture of 98% by weight of dried Dowanol™ PMA and 2 weight percent vinylene carbonate. Battery Example 19 performs similarly to Battery Example 18.

Battery Example 20 is made in the same manner, except that the electrolyte solution consists of a 1.0 M solution of $LiPF_6$ in a mixture of 98% by weight of a 4:1 by volume dried Dowanol™ PMA:ethylene carbonate blend and 2 weight percent vinylene carbonate. Battery Example 20 performs equivalently to Comparative Battery T.

Battery Example 21 is made in the same manner, except that the electrolyte solution consists of a 1.0 M solution of $LiPF_6$ in a mixture of 90% by weight of dried Dowanol™ PMA and 10 weight percent vinylene carbonate. Battery Example 21 performs similarly to Battery Example 18. This example together with Example 19 demonstrates that in a larger battery, having a ratio of electrolyte volume:capacity of about 2, a larger amount of the vinylene carbonate may be needed to obtain good SEI formation and electrolyte stability.

Battery Example 22 is made in the same manner, except that the electrolyte solution consists of a 1.0 M solution of LiPF$_6$ in a mixture of 98% by weight of dried Dowanol™ PMA and 10 weight percent 4-vinyl-1,3-dioxolan-2-one. Battery Example 22 performs similarly to Comparative Battery T, and again suggests that a larger amount of the vinylene carbonate may be needed to obtain good SEI formation and electrolyte stability in a larger battery.

EXAMPLE 23 and Comparative Battery U

A control battery electrolyte solution consisting of a 1.0 M solution of LiPF$_6$ in a 50/50 by volume mixture of ethylene carbonate and diethyl carbonate is introduced into a 2025 button cell having a high power Li$_{1.1}$(Ni$_{1/3}$Mn$_{1/3}$Co$_{1/3}$)$_{0.9}$O$_2$ (NMC) cathode, a graphite anode, and a polyolefin separator. The water content of this battery electrolyte solution is about 1000 ppm. The button cell is designated as Comparative Battery U.

Battery Example 23 is made in the same manner, except that the electrolyte solution consists of a 1.0 M solution of LiPF$_6$ in a mixture of 98% by weight Dowanol PMA and 2 weight percent vinylene carbonate. The water content of this electrolyte solution is also about 1000 ppm.

Cyclability testing is performed on Comparative Battery U and Battery Example 23 as in previous examples. Comparative Battery U loses about 12% of its capacity after only 100 cycles. Battery Example 23 loses only about 3.5% of its capacity after 100 cycles.

EXAMPLE 24-27

In Battery Example 24, the cyclic voltametry (current density µA/cm$^2$ vs. potential, V vs. Li/Li$^+$) of a battery electrolyte solution consisting of a 1.0 M solution of LiPF$_6$ in 2,2,2-trifluoroethyl acetate is recorded with a platinum working electrode, lithium foil counter electrode and reference electrodes. The scan rate is 50 mV/s and the voltage stability is calculated at the current density of 300 µA/cm$^2$. The voltage stability is found to be 4.89 V.

Battery Example 25 is carried out in the same manner as in Example 24, except that the electrolyte solution consists of a 1.0 M solution of LiPF$_6$ in ethyl 3,3,3-trifluoropropionate. The voltage stability is found to be 4.67 V.

Battery Example 26 is carried out in the same manner as in Example 24, except that the electrolyte solution consists of a 1.0 M solution of LiPF$_6$ in methyl 2-fluoroacetate. The voltage stability is found to be 4.79 V.

Battery Example 27 is carried out in the same manner as in Example 24, except that the electrolyte solution consists of a 1.0 M solution of LiPF$_6$ in 2-methoxy-1-methylethyl 2-methoxyacetate. The voltage stability is found to be 4.58 V.

What is claimed is:

1. A nonaqueous battery electrolyte solution comprising:
   (1) at least one lithium salt in an amount to provide at least a 0.1 M solution of the lithium salt in the battery electrolyte solution,
   (2) 2 methoxy-1-methylethyl acetate, 2-methoxy-2-methylethyl acetate, 2-ethoxy-1-methylethyl acetate, 2-ethoxy-2-methylethyl acetate, 2-methoxyethyl propionate, 2-ethyoxyethyl propionate, 2-methoxy-1-methylethyl propionate, 2-ethoxy-1-methylethyl propionate, 2-methoxy-2-methylethyl propionate, 2-ethoxy-2-methylethyl propionate, or a mixture of any two or more thereof and
   (3) from 0.5 to 5% by weight, based on the combined weight of components (2) and (3), of vinylene carbonate, 4-vinyl-1,3-dioxolan-2-one, fluoroethylenecarbonate or a mixture of any two or more thereof,
   which battery electrolyte solution contains from 0 to 30% by weight of an additional solvent.

2. The battery electrolyte solution of claim 1 wherein the additional solvent is ethylene carbonate, propylene carbonate, a dialkyl carbonate or mixture thereof.

3. The battery electrolyte solution of claim 2 which contains no more than 5% by weight of ethylene carbonate, propylene carbonate, a dialkyl carbonate or mixture thereof.

4. A nonaqueous battery electrolyte solution comprising:
   (1) at least one lithium salt in an amount to provide at least a 0.1 M solution of the lithium salt in the battery electrolyte solution, and
   (2) a 2-alkoxy-1-alkylethyl acetate or 2-alkoxy-2-alkylethyl acetate having up to 12 carbon atoms, wherein the alkoxy group contains from 1 to 7-carbon atoms and may be partially or completely fluorinated and wherein the alkyl group contains from 1 to 7-carbon atoms and may be partially or completely fluorinated, in an amount sufficient to dissolve the lithium salt and which further contains (3) from 0.5 to 5% by weight of vinylene carbonate or 4-vinyl-1,3-dioxolan-2-one based on the combined weight of components (2) and (3).

5. The battery electrolyte solution of claim 4 wherein the 2-alkoxy-1-alkylethyl acetate or 2-alkoxy-2-alkylethyl acetate compound is 2-2-methoxy-1-methylethyl acetate, 2-methoxy-2-methylethyl acetate, 2-ethoxy-1-methylethyl acetate, 2-ethoxy-2-methylethyl acetate or mixture of two or more thereof.

6. The battery electrolyte solution of claim 1 wherein the lithium salt is at least one of LiPF$_6$, LiClO$_4$, LiBF$_4$, LiAsF$_6$, LiCF$_3$SO$_3$ and Li[(CF$_3$SO$_3$)$_2$N].

7. The battery electrolyte solution of claim 1 which further comprises at least one other additive selected from a cathode protection agent, a lithium salt stabilizer, a lithium deposition improving agent, an ionic solvation enhancer, a corrosion inhibitor, a wetting agent and a viscosity reducing agent.

8. An electrical battery comprising a graphite anode, a cathode, a separator disposed between the anode and cathode, and an electrolyte solution in contact with the anode and cathode, wherein the electrolyte solution is a battery electrolyte solution of claim 1.

9. The electrical battery of claim 8 which is a secondary battery.

10. The electrical battery of claim 9, which is a lithium ion, lithium sulfur, lithium metal or lithium polymer battery.

11. The battery electrolyte solution of claim 1, wherein component (3) is vinylene carbonate.

12. The battery electrolyte solution of claim 1, wherein component (3) is 4-vinyl-1,3-dioxolan-2-one.

13. The battery electrolyte solution of claim 1, wherein component (3) is fluoroethylenecarbonate.

14. An electrical battery comprising a graphite anode, a cathode, a separator disposed between the anode and cathode, and an electrolyte solution in contact with the anode and cathode, wherein the electrolyte solution is a battery electrolyte solution of claim 4.

15. An electrical battery comprising a graphite anode, a cathode, a separator disposed between the anode and cathode, and an electrolyte solution in contact with the anode and cathode, wherein the electrolyte solution is a battery electrolyte solution of claim 11.

16. An electrical battery comprising a graphite anode, a cathode, a separator disposed between the anode and cathode, and an electrolyte solution in contact with the anode and cathode, wherein the electrolyte solution is a battery electrolyte solution of claim 12.

17. An electrical battery comprising a graphite anode, a cathode, a separator disposed between the anode and cathode, and an electrolyte solution in contact with the anode and cathode, wherein the electrolyte solution is a battery electrolyte solution of claim 13.

* * * * *